(12) United States Patent
Kamata

(10) Patent No.: US 7,570,821 B2
(45) Date of Patent: Aug. 4, 2009

(54) APPARATUS AND METHOD FOR IMAGE CODING

(75) Inventor: Seiichiro Kamata, Nogata (JP)

(73) Assignee: Kitakyushu Foundation for the Advancement of Industry, Science and Technology, Fukuoka (JP)

( * ) Notice: Subject to any disclaimer, the term of this patent is extended or adjusted under 35 U.S.C. 154(b) by 653 days.

(21) Appl. No.: 11/264,134

(22) Filed: Nov. 2, 2005

(65) Prior Publication Data

US 2007/0098271 A1 May 3, 2007

(51) Int. Cl.
*G06K 9/36* (2006.01)
(52) U.S. Cl. .................. 382/232; 382/243; 382/312; 382/318
(58) Field of Classification Search .......... 382/232, 382/243, 252, 312, 318; 707/2; 375/E9.09, 375/E9.161
See application file for complete search history.

(56) References Cited

U.S. PATENT DOCUMENTS 6,865,567 B1 * 3/2005 Oommen et al. ............ 707/2

FOREIGN PATENT DOCUMENTS

| JP | 06-113289 | 4/1994 |
| JP | 11-353453 | 12/1999 |
| JP | 2000-253396 | 9/2000 |
| JP | 2002-354267 | 12/2002 |

OTHER PUBLICATIONS

Office Action dated Nov. 16, 2007 from Japan Patent Office, issued in JP2003-411280 and its partial translation.
T. Mogi; "Compression of Natural and Synthetic Compound Image by Using Region Separation;" *The Institute of Electronics, Information and Communication Engineers D-II*; vol. J82-D-II; No. 7; Jul. 1999; pp. 1150-1160./Discussed in the specification.

* cited by examiner

*Primary Examiner*—Anh Hong Do
(74) *Attorney, Agent, or Firm*—Edwards Angell Palmer & Dodge LLP

(57) ABSTRACT

An image coding technique capable of realizing a high speed coding processing for a mixed image with less a visual distortion. The image coding apparatus includes: plural scan units 3 each having a scan apparatus 7 scanning an original image to be encoded according to a prescribed scan sequence and piecewidth linear approximation apparatus 9 dividing a one-dimensional original image generated by scanning the original image with the scan apparatus 7 into plural intervals so that an accumulated square error or a dispersion of pixel values in each interval is a prescribed threshold value or less to generate one-dimensional approximation image data obtained by approximation of pixel values by the average value of pixel values in the intervals, which correspond to each of plural scan sequences different from one another; and optimal scan selecting apparatus 4 comparing the numbers of intervals obtained by dividing of the piecewidth linear approximation apparatus 9 of the scan units 3 to thereby select one dimensional approximation image data having a minimum number of intervals.

17 Claims, 25 Drawing Sheets

FIG. 12

| memory address | image region coordinates |
|---|---|
| 0 | (1,1) |
| 1 | (2,1) |
| ⋮ | ⋮ |
| p-1 | (p,1) |
| p | (1,2) |
| p+1 | (2,2) |
| ⋮ | ⋮ |
| 2p-1 | (p,2) |
| ⋮ | ⋮ |
| (q-1)p | (1,q) |
| (q-1)p+1 | (2,q) |
| ⋮ | ⋮ |
| qp-1 | (p,q) |

FIG. 13

| scan sequence | memory address | image region coordinates |
|---|---|---|
| 0 | 0 | (1,1) |
| 1 | 1 | (2,1) |
| ⋮ | ⋮ | ⋮ |
| p-1 | p-1 | (p,1) |
| p | 2p-1 | (p,2) |
| p+1 | 2p-2 | (p-1,2) |
| ⋮ | ⋮ | ⋮ |
| 2p-1 | p | (1,2) |
| ⋮ | ⋮ | ⋮ |
| (q-1)p | qp-1 | (p,q) |
| (q-1)p+1 | qp-2 | (p-1,q) |
| ⋮ | ⋮ | ⋮ |
| qp-1 | (q-1)p | (1,q) |

FIG. 15

| clock | 0 | ... | 1 | ... | N | N+1 | N+2 | ... | N+N_1+1 | ... | 2N |
|---|---|---|---|---|---|---|---|---|---|---|---|
| (1) | — | ... | $x_1$ | ... | $x_N$ | — | $x_1$ | ... | $x_{N_1}$ | ... | $x_{N-1}$ |
| (2) | — | ... | $x_1^2$ | ... | $x_N^2$ | — | $x_1^2$ | ... | $x_{N_1}^2$ | ... | $x_{N-1}^2$ |
| (3) | 0 | ... | $x_1^2$ | ... | $\sum_{i=1}^N x_i^2$ | 0 | $x_1^2$ | ... | $\sum_{i=1}^{N_1} x_i^2$ | ... | $\sum_{i=1}^{N-1} x_i^2$ |
| (4) | 0 | ... | $x_1$ | ... | $\sum_{i=1}^N x_i$ | 0 | $x_1$ | ... | $\sum_{i=1}^{N_1} x_i$ | ... | $\sum_{i=1}^{N-1} x_i$ |
| (5) | — | ... | — | ... | $N$ | — | $x_1^2$ | ... | $\left(\sum_{i=1}^{N_1} x_i\right)^2 / N_1$ | ... | $\left(\sum_{i=1}^{N-1} x_i\right)^2 / (N-1)$ |
| (6) | 0 | ... | — | ... | — | 0 | 0 | ... | $N_1$ | ... | $N-1$ |
| (7) | — | ... | — | ... | — | — | 0 | ... | $\left(\sum_{i=1}^{N_1} x_i^2 - \left(\sum_{i=1}^{N_1} x_i\right)^2 / N_1\right)$ | ... | $\sum_{i=1}^{N-1} x_i^2 - \left(\sum_{i=1}^{N-1} x_i\right)^2 / (N-1)$ |
| (8) | — | ... | — | ... | — | $\sum_{i=1}^N x_i^2$ | $\sum_{i=2}^N x_i^2$ | ... | $\sum_{i=N_1+1}^N x_i^2$ | ... | $x_N^2$ |
| (9) | — | ... | — | ... | — | $\sum_{i=1}^N x_i$ | $\sum_{i=2}^N x_i$ | ... | $\sum_{i=N_1+1}^N x_i$ | ... | $x_N$ |
| (10) | — | ... | — | ... | — | — | $\left(\sum_{i=2}^N x_i\right)^2 / (N-1)$ | ... | $\left(\sum_{i=N_1+1}^N x_i\right)^2 / (N-N_1)$ | ... | $x_N^2$ |
| (11) | — | ... | — | ... | — | $N$ | $N-1$ | ... | $N-N_1$ | ... | $1$ |
| (12) | — | ... | — | ... | — | — | $\left(\sum_{i=2}^N x_i^2 - \left(\sum_{i=2}^N x_i\right)^2 / (N-1)\right)$ | ... | $\left(\sum_{i=N_1+1}^N x_i^2 - \left(\sum_{i=N_1+1}^N x_i\right)^2 / (N-N_1)\right)$ | ... | $0$ |
| (13) | — | ... | — | ... | — | — | — | ... | — | ... | $0$ |
| (14) | — | ... | — | ... | — | — | (8)+(14) | ... | (8)+(14) | ... | (8)+(14) |
| (15) | — | ... | — | ... | — | — | $x_1$ | ... | $\sum_{i=1}^N x_i / N_1$ | ... | $\sum_{i=1}^{N-1} x_i / (N-1)$ |
| (16) | — | ... | — | ... | — | — | $\sum_{i=2}^N x_i / (N-1)$ | ... | $\sum_{i=N_1+1}^N x_i / (N-N_1)$ | ... | $x_N$ |

FIG. 17

| small interval | interval linear data |
|---|---|
| 1 | $(c_{1,1}, l_{1,1})$ |
| | $\vdots$ |
| | $(c_{1,f(1)}, l_{1,f(1)})$ |
| $\vdots$ | $\vdots$ |
| i | $(c_{i,1}, l_{i,1})$ |
| | $\vdots$ |
| | $(c_{i,f(i)}, l_{i,f(i)})$ |
| i+1 | $(c_{i+1,1}, l_{i+1,1})$ |
| | $\vdots$ |
| | $(c_{i+1,f(i+1)}, l_{i+1,f(i+1)})$ |
| $\vdots$ | $\vdots$ | merger processing → (0,0) (invalidity processing)
→ $(c'_{i+1,1}, l'_{i+1,1})$

APPARATUS AND METHOD FOR IMAGE CODING

BACKGROUND OF THE INVENTION

1. Field of the Invention

The invention relates to an image coding technique used in compression, transmission or the like of an image, and in particular, to an image coding technique capable of optimally encoding a mixed image in which an artificial image and a natural image are mixed.

2. Description of the Related Art

A mixed image is an image in which a natural image such as a photograph and an artificial image such as a letter, graphics or illustrations coexist. As techniques for non-reversible compression of a mixed image, there have conventionally been widely employed various kinds of coding schemes such as JPEG, GIF, and TIFF.

An original image to be encoded is different in nature of a pattern therein according to whether the original image is a natural image or an artificial image. In a natural image, there is a large correlation between pixels and a continuous change in pixel value. On the other hand, an artificial image has a nature that not only many of intervals in which pixel values are continuous in a similar way, but also has many of sharp edges. With such a difference in nature of a pattern between the images based on attributes thereof, all kinds of mixed images have had difficulty in optimally encoding the mixed image by means of a conventional image coding scheme described above.

For example, in a case where a mixed image is encoded with JPEG, mosquito noise is generated in profiles of a letter or graphics in an artificial image portion, leading to a great visual degradation. This is because JPEG concentrates spectra in a low band, while deleting high band information by means of discrete cosine transformation (hereinafter referred as [DCT]). In a case where a mixed imaged is encoded with a scheme such as GIF or TIFF, a coding efficiency for a natural image is lower as compared with JPEG, though both schemes are suited for compression of an artificial image.

Hence, as a technique encoding such a mixed image optimally, a proposal has been made on a coding technique in which a mixed image is separated into two regions, one of which is a discrete gray scale region mainly constituted of an artificial image and the other of which is a continuous gray scale region mainly constituted of a natural image to encode the regions using run length coding and JPEG, respectively, based on characteristics of the regions (see Takeshi MOGI, "Compression of Natural and Artificial Mixed Image Based on Region Separation" The Institute of Electronics, Information and Communication Engineers, transaction of The Institute of Electronics, Information and Communication Engineers D-II, Vol. J82-D-II, No. 7, p. 1150-1160, July 1999).

In the image coding scheme separating a mixed image into two regions: a discrete gray scale region mainly constituted of an artificial image and a continuous gray scale region mainly constituted of a natural image, however, a computational volume is great in operation of region division of an image, which makes it unsuitable for a high speed image compression.

If parallel processing is implemented on a hardware, a high speed processing is enabled. In this case, however, a circuit scale is tremendously large.

SUMMARY OF THE INVENTION

It is accordingly an object of the invention to provide an image coding technique capable of realizing a high speed coding processing for a mixed image with less of a visual distortion and further realizing a small scale circuit even if the coding is parallel processed on a hardware.

A first construction of an image coding apparatus of the invention includes:
- (A) plural scan units which correspond to each of plural scan sequences different from one another, and each having
  - (a) a scan means scanning an original image to be encoded according to a prescribed scan sequence, and
  - (b) a piecewidth linear approximation (hereinafter referred to as "PLA") means dividing a one-dimensional (hereinafter referred to as "1D") original image generated by scanning said original image with said scan means into plural intervals so that accumulated square error or a dispersion of pixel values in each interval is a prescribed threshold value or less to generate 1D approximation image data obtained by approximation of pixel values by the average value of pixel values in the interval; and
- (B) optimal scan selecting means comparing the numbers of intervals obtained by division by said PLA means of said scan units to thereby select said 1D approximation image data having a minimum number of intervals.

With this construction adopted, each scan unit divides the one-dimensional original image into plural intervals so that an accumulated square error or a dispersion of pixel values in each interval is a prescribed threshold value or less. Then, one-dimensional approximation image data is generated that is obtained by approximating pixel values in each interval by the average value of the pixel values in the interval (the approximation is hereinafter referred to as "piecewidth linear approximation"). The optimal scan selecting means compares the numbers of intervals that the piecewidth linear approximation means of the respective scan units divided. Then, the optimal scan selecting means selects a one-dimensional approximation image data having a minimum number of intervals. In such a way, the optimal scan selecting means estimates a scan sequence minimizing a code volume after coding in a previous stage before coding the image as a scan sequence minimizing the number of intervals that the piecewidth linear approximation means divided. Thereby, the scan sequence is selected as the optimal scan sequence. The one-dimensional approximation image data obtained by the piecewidth linear approximation after scanning according to the optimal scan sequence is encoded by means of a run length coding or the like later to thereby complete the optimal coding of the original image.

By selecting an operation sequence with the number of intervals in piecewidth linear approximation as an index, the optimal scan sequence in coding is determined so as to be adapted to an attribute of an image such as an image having a small change in pixel value except an edge as in an artificial image including a document image and a graphic image, or an image such as an image having a large change in value between adjacent pixels as in a natural image. Hence, one-dimensionalization of an original image is implemented based on a scan sequence adapted to the nature of an image. In the invention, piecewidth linear approximation is adopted in approximation of an original image for coding and an optimal scan sequence is thereby selected based on the number of intervals in piecewidth linear approximation prior to perfect coding. Such a procedure enables a high speed coding.

In the invention, selection of an operation sequence is implemented using comparison between the numbers of intervals of one-dimensional approximation image data obtained by piecewidth linear approximation. With adoption of such a selection, a circuit configuration for conducting parallel processing on hardware can be realized on a small scale thereof since an algorithm thereof is simple.

A second construction of an image coding apparatus of the invention is characterized in that in the first construction, said PLA means executes a bisecting processing dividing said 1D original image at a divisional position at which the sum of accumulated square errors or dispersions of pixel values in both intervals is minimized when said 1D original image is divided into two, and in a case where the sum of the accumulated square errors or the dispersions of pixel values in the both intervals obtained by division by said bisecting processing is a prescribed threshold value or more, said bisecting processing in the interval is implemented recursively to divide said 1D original image, when said 1D original image is divided.

In such a way, in the invention, the piecewidth linear approximation means implements the bisecting processing recursively to thereby divide the one-dimensional original image into small intervals. With such a construction, an edge portion of an image is preserved as a divisional position in interval division. Therefore, even when an image in which emphasis is placed on an edge thereof as in an artificial image is encoded, a visual distortion of an image to be encoded can be suppressed at the lowest possible level.

A third construction of an image coding apparatus of the invention is characterized in that in the first construction, small interval division means dividing said 1D original image into plural small intervals is provided, and said PLA means generates said 1D approximation image data for said 1D original image of each small interval obtained by division by said small interval division means.

By, in such a way, dividing a one-dimensional original image with the small interval division means into small intervals to thereby conduct the piecewidth linear approximation in each small interval with the piecewidth linear approximation means, a computational volume conducted by the piecewidth linear approximation means gets less. Hence, a coding processing can be conducted at a high speed. Especially, in a case where a recursive processing is used in piece width linear approximation, a computational volume can be greatly reduced by division into small intervals.

A fourth construction of an image coding apparatus of the invention is characterized in that in the third construction, merger processing means replacing the approximate value of the both intervals with the average of the values of all the pixels of the both intervals in connection with 1D approximation image data of said each small interval generated by said PLA means, if a difference between the averages of pixel values in the intervals between the opposing ends in adjacent two small intervals is a prescribed threshold value or less and a length of one interval is a prescribed threshold value or less.

In such a way, in the invention, the intervals between the opposing ends in adjacent two small intervals are merged by the merger means under a prescribed condition. Thereby, useless interval division can be deleted and the number of intervals in all of the one-dimensional approximation image data can be reduced. Therefore, a coding efficiency is improved.

The reason why, as a condition for merging the two intervals, a difference between the averages of pixel values in both intervals is a prescribed threshold value or less is that in a case where a difference between averages of pixel values in both intervals is larger, an increase in approximation error due to the merger is larger.

The reason why, as a condition for merging the two intervals, a length of one interval is a prescribed threshold value or less is that even if edge information is lost by merger of the intervals in a short interval, the loss is not visually conspicuous and only a distortion, if any, of the order that can be actually neglected is generated.

A fifth construction of an image coding apparatus of the invention is characterized by that in the first construction, said optimal scan selecting means makes the PLA means, having not completed generation processing of said 1D approximation image data in prescribed time, terminate the generation processing, and compares the numbers of intervals obtained by division by said PLA means of said scan units having completed the processing to thereby select said 1D approximation image data having a minimum number of intervals, when said PLA means of a prescribed number of said scan units complete generation processing of said 1D approximation image data.

A time spent in piece width linear approximation processing by piece width linear approximation means generally increases with more of intervals obtained by division. Therefore, the number of intervals completing generation processing of one-dimensional approximation image data fastest has a possibility to be the minimum in number. Therefore, when the piecewidth linear approximation processing of a prescribed number of scan units is completed, the piecewidth linear approximation processing may be terminated on the rest of scan units. By terminating the piecewidth linear approximation processing on the rest of scan units in this way, the processing of the optimal scan selecting means is terminated faster, thereby enabling a high speed processing to be realized.

A sixth construction of an image coding apparatus of the invention is characterized by that in the first construction, said optimal scan selecting means starts counting of clocks, when generation processing of said 1D approximation image data of one of said PLA means of said scan units ends, and makes said PLA means, having not completed generation processing of said 1D approximation image data in a prescribed time, terminate the generation processing, and compares the numbers of intervals obtained by division by said PLA means of said scan units having completed the processing in the prescribed time, to thereby select said 1D approximation image data having a minimum number of intervals.

The number of intervals of scan units having not completed generation processing of one-dimensional approximation image data in a prescribed time after one of the piecewidth linear approximation means of the scan units completes generation processing of one-dimensional approximation image data is thought to be larger than the number of intervals of one-dimensional approximation image data in the scan unit having completed piecewidth linear approximation processing at the first beginning. Therefore, piecewidth linear approximation processing by a scan unit to take such a processing time is terminated when a prescribed time elapses to thereby enable the optimal selection in scan sequence to be ensured and to further enable a coding processing time to be decreased.

A seventh construction of an image coding apparatus of the invention is characterized by that in the first construction, said optimal scan selecting means, when generation processing of said 1D approximation image data of one of said PLA means of said scan units is completed, transmits the number of intervals of the 1D approximation image data as a reference number of intervals to other said scan units, said PLA means of said each scan unit, when said scan unit receives said reference number of intervals, terminates generation processing of said 1D approximation image data if the number of intervals obtained by division of a 1D original image exceeds the number obtained by adding a prescribed value to the reference number of intervals, and said optimal scan selecting means compares the numbers of intervals obtained by division by said PLA means of said scan units having completed generation processing of the 1D approximation image data, to select 1D approximation image data having a minimum number of intervals.

In a case where the number of intervals exceeds the number obtained by adding a prescribed value to the reference number of intervals, a possibility that the number of intervals is less than the reference number of intervals even if merger processing or the like is conducted thereafter. Therefore, a scan unit having such an increased number of intervals is terminated in piecewidth linear approximation processing thereof when the number of intervals thereof reaches to a prescribed number, thereby enabling optimal selection in scan sequences to be realized and a coding processing time to be shortened.

An eighth construction of an image coding apparatus of the invention is characterized in that in the first construction, at least one orthogonal transformation unit including:

(a) an orthogonal transformation means conducting orthogonal transformation on an original image to be encoded to generate a transformed image;
(b) a quantizing means quantizing the transformed image by adaptive bit assignment to thereby generate a quantization transformed image; and
(c) a run data generating means not only scanning the quantization transformed image in a prescribed route, but also generating run data constituted of a pair of a run length in which pixels with the same value continues along a scan route and the pixel value for the run is provided, wherein said optimal scan selecting means compares the numbers of intervals obtained by division by said PLA means of said scan units and the numbers of runs generated by said run data generating means of said orthogonal transformation unit (hereinafter referred to as the "number of run") to thereby select a 1D approximation image data having a minimum number of intervals or a minimum number of runs.

According to the construction, the numbers of runs outputted by the orthogonal transformation unit are fewer than the number of intervals outputted by each scan unit for an image good in compression ratio by orthogonal transformation as in a natural image. Therefore, the optimal scan selecting means select run data having the minimum number of runs. In such a way, one-dimensional approximation data or run data adapted to the nature of an image is selected, leading to more optimal coding to be achieved. As a result, a coding efficiency is improved more.

Note that the "adapted bit assignment" means that in an ordinary image, more of bits are assigned to pixels on the low frequency side in which power of pixel signals is concentrated to quantize the pixels, while less of bits are assigned to the high frequency component having smaller power of pixel signals to quantize the pixels. The adaptive bit assignment is a method having been widely used in transformation coding.

A first construction of an image coding method of the invention includes a first step of dividing a 1D original image generated by scanning an original image to be coded according to a prescribed scan sequence into plural interval so that an accumulated square error or a dispersion of pixel values in each interval is prescribed threshold value or less and conducting PLA processing generating 1D approximation image data obtained by approximation of pixel values by the average of pixel values in each of the intervals in parallel so as to be adapted to respective plural scan sequences different from one another;

a second step of comparing the numbers of intervals of 1D approximation image data obtained by PLA processing in the respective scan sequences to thereby select 1D approximation image data having a minimum number of intervals; and a third step of coding the selected 1D approximation image data.

A second construction of an image coding method of the invention is characterized in that in the first construction, the PLA processing conducts a bisecting processing dividing the 1D original image at a divisional position at which the sum of accumulated square errors or dispersions of pixel values in both intervals into which the 1D original image is divided is minimized, wherein in a case where the sum of the accumulated square errors or the dispersions of pixel values in the both intervals into which the 1D original image is divided by bisecting processing is a prescribed threshold value or more, the bisecting processing in the both intervals is implemented recursively to divide the 1D original image.

A third construction of an image coding method of the invention is characterized in that, in the first or second construction, in the first step, orthogonal transformation is conducted on an original image to be coded to thereby generate a transformed image, a quantization transformed image is generated by quantizing the transformed image by adapted bit assignment, and not only is the quantization transformed image scanned in a prescribed route, but scanning generating run data constituted of a pair of a run length in which pixels with the same value continues along a scan route and the pixel value of the run is also conducted in parallel;

in the second step, the numbers of intervals of 1D approximation image data obtained by PLA processing in the respective scan sequence and the numbers of runs of the run data (hereinafter referred to as the "number of runs") are compared to thereby select 1D approximation image data having a minimum number of intervals or a minimum number of runs; and in the third step, the selected 1D approximation image data or the selected run data is encoded.

According to the invention, as described above, by conducting selection of an operation sequence with the number of intervals of piecewidth linear approximation as an index, an optimal scan sequence is selected for coding so as to be adapted to an attribute of an image such as an image having a small change in value of a pixel except an edge as in an artificial image such as a document image or a graphic image, or an image having a large change in value between adjacent pixels as in a natural image. Therefore, one-dimensionalization of an original image according to a scan sequence adapted to the nature of an image is implemented.

Piecewidth linear approximation is used for approximation of an original image to be encoded and prior to perfect coding, an optimal scan sequence is selected based on the number of intervals in piecewidth linear approximation, thereby enabling high speed coding processing to be realized.

BRIEF DESCRIPTION OF THE DRAWING

FIG. 12 is a representation showing contents of an image region memory 7$a$.

FIG. 13 is a representation showing contents of a memory in a scan address generator 7$b$.

FIG. 15 is a representation showing operational outputs at nodes of FIG. 14.

FIG. 17 is a representation showing contents of a small interval approximation image memory 15.

DESCRIPTION OF THE PREFERRED EMBODIMENTS

Description will be given of the best mode for carrying out the invention below with reference to the accompanying drawing.

First Embodiment

Figure 1:
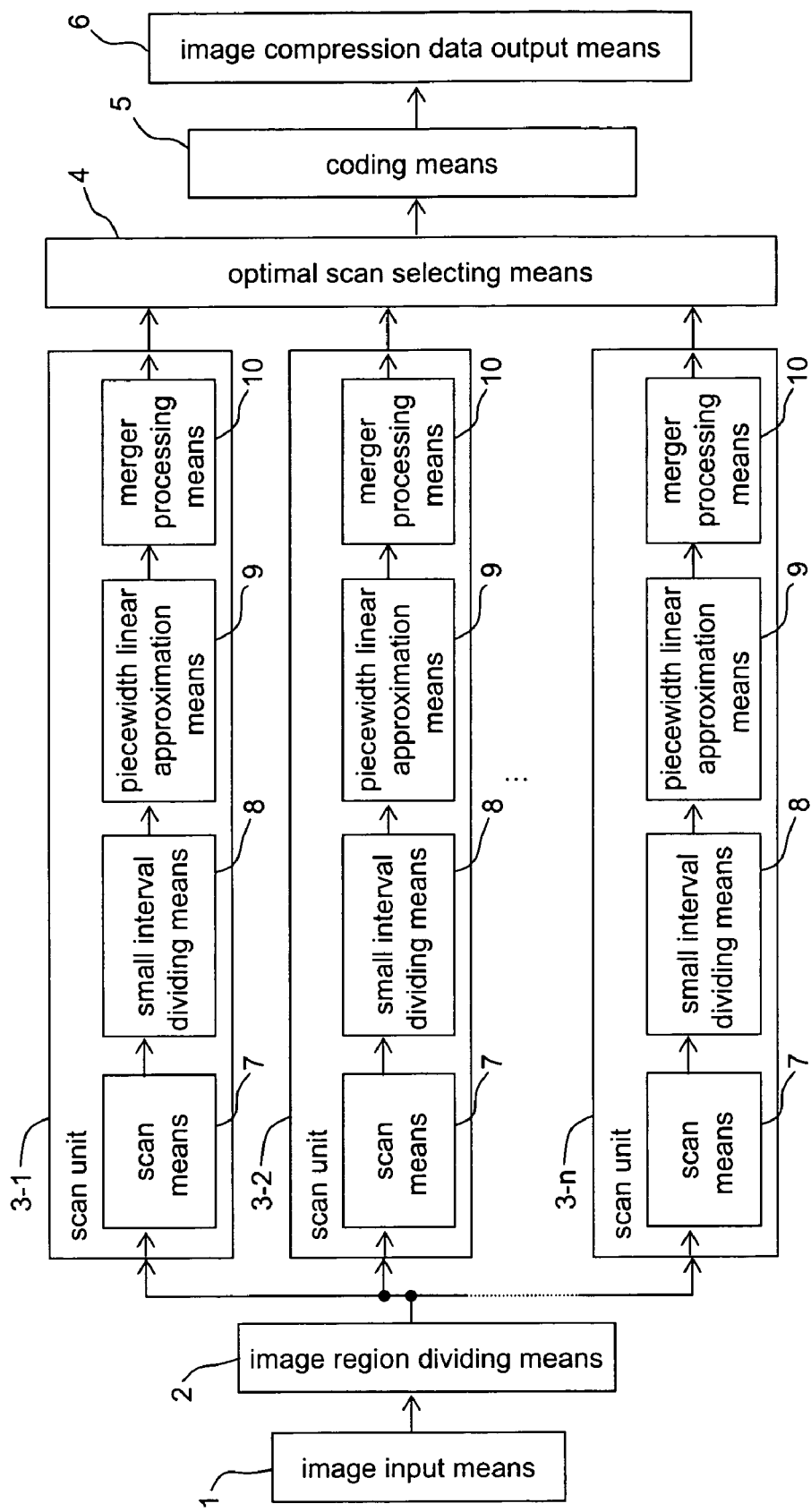
FIG. 1 is an overall construction diagram of an image coding apparatus concerning a first embodiment of the invention.

FIG. 1 is an overall construction diagram of an image coding apparatus concerning a first embodiment of the invention. In FIG. 1, the image coding apparatus concerning the first embodiment of the invention includes: an image input means 1; an image region dividing means 2; n (n≧2) scan units 3-1 to 3-$n$; an optimal scan selecting means 4; a coding means 5; and an image compression data output means 6.

The image input means 1 inputs data of an original image to an image input apparatus. Examples of the image input means 1 include: an image pick-up device such as a CCD device; a television receiver; and image storage apparatus such as a magnetic disc apparatus. The image region dividing means 2 divides an image inputted from the image input means 1 into plural small regions (image blocks). The scan units 3-$i$ (i=1, . . . , n) not only scan the image blocks divided by the image region dividing means 2 according to respective predetermined scan sequences, but also conduct piecewidth linear approximation processing to generate one-dimensional approximation image data.

The optimal scan selecting means 4 compares the numbers of intervals of one-dimensional approximation image data generated by the scan units 3-$i$ (i=1, . . . , n) to select one-dimensional approximation image data having a minimum number of intervals. The coding means 5 encodes the one-dimensional approximation image data selected by the optimal scan selecting means 4 according to various kinds of coding schemes to output a coded image. The image compression data output means 6 outputs a coded image generated by the coding means 5. An image transmitter, an image storage apparatus and others are employed as the image compression data output means 6.

Figure 2:
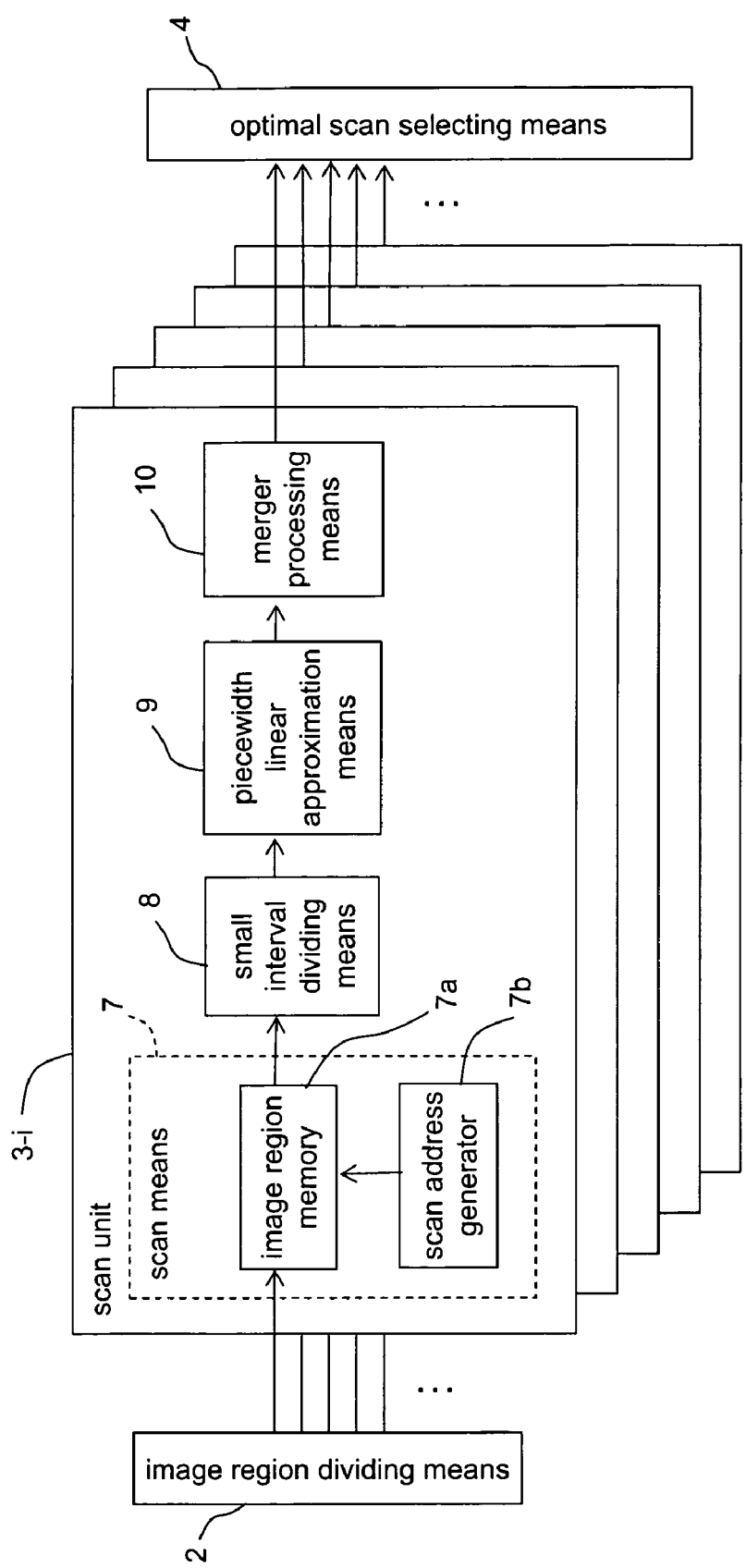
FIG. 2 is a block diagram showing a configuration of each scan unit 3-*i* (i=1, . . . , n) of FIG. 1.

FIG. 2 is a block diagram showing a configuration of each scan unit 3-$i$ (i=1, . . . , n) of FIG. 1. A scan unit 3-$i$ (i=1, . . . , n) is constituted of a scan means 7, a small interval dividing means 8, a piecewidth linear approximation means 9 and a merger processing means 10.

The scan means 7 scans the image blocks obtained by division by the image region dividing means 2 according to a predetermined scan sequence to generate a one-dimensional original image. The scan means 7 includes: an image region memory 7$a$ and a scan address generator 7$b$. Pixel values in image blocks are stored in respective memory addresses according to a scan sequence in the image region memory 7$a$. The scan address generator 7$b$ generates scan coordinates in image blocks according to scan sequences predetermined to the respective scan units 3-$i$ (i=1, . . . , n). The image region memory 7$a$ scans image blocks by acquiring pixel values at scan coordinates from the image blocks.

The small interval dividing means 8 further divides a one-dimensional original image generated by the scan means 7 into plural small intervals (original image data in each small interval is hereinafter referred to as a "small interval data"). The piecewidth linear approximation means 9 generates a small interval approximation image by approximating data of each of small intervals generated by the small interval dividing means 8 using piece width linear approximation. The merger processing means 10 merges small interval one-dimensional approximation image data generated by the piece width linear approximation means 9 by means of a prescribed method to generate one-dimensional approximation image data. The one-dimensional approximation image data is outputted to the optimal scan selecting means 4.

Figure 3:
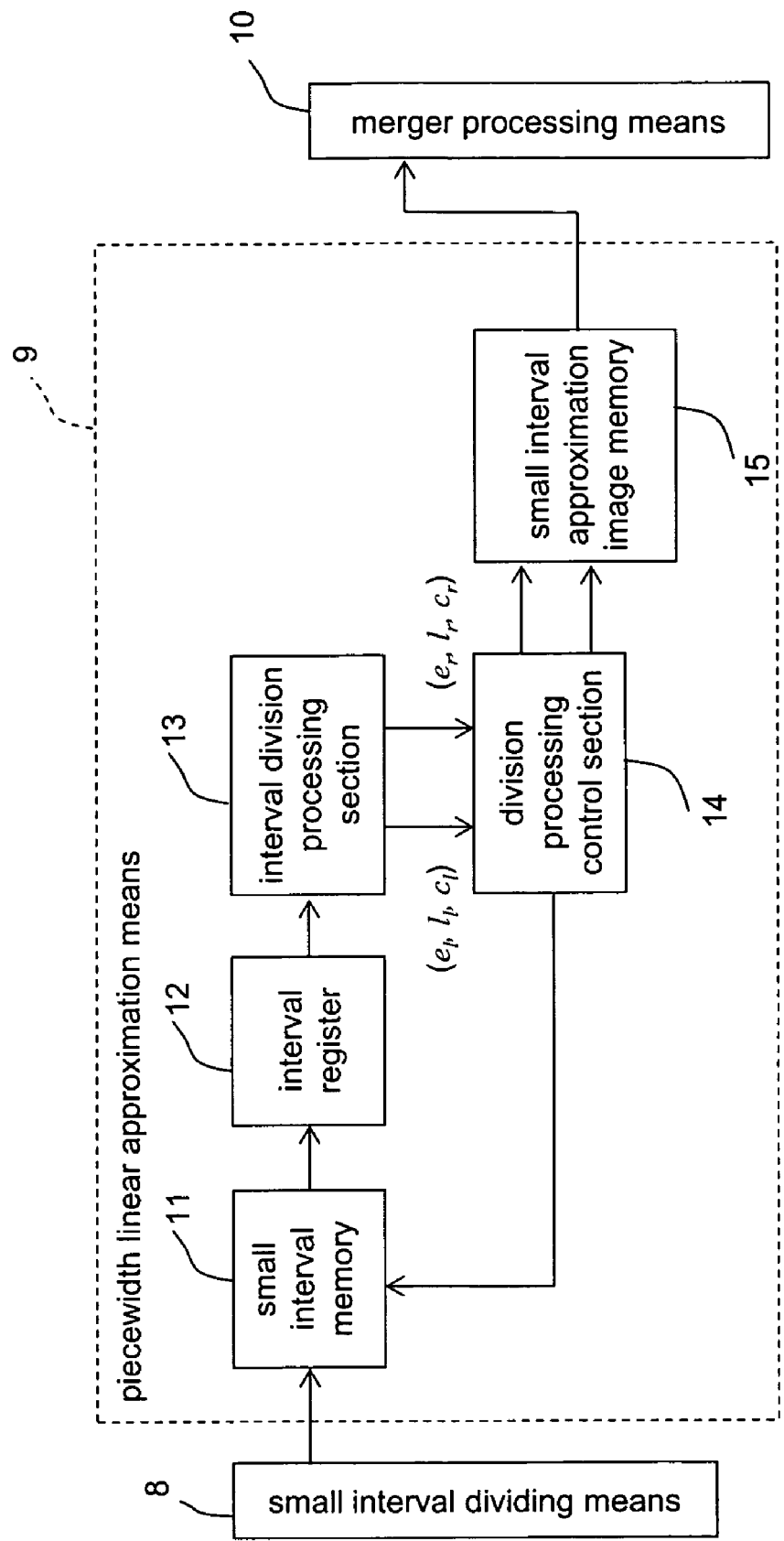
FIG. 3 is a block diagram showing a configuration of a piecewidth linear approximation means 9 of FIG. 2.

FIG. 3 is a block diagram showing a configuration of a piecewidth linear approximation means 9 of FIG. 2. The piece width linear approximation means 9 is constituted of a small interval memory 11; an interval register 12; an interval division processing section 13; a division processing control section 14; and a small interval approximation image memory 15.

The small interval memory 11 stores data of small intervals obtained by division by the small interval dividing means 8. The interval register 12 stores data of an interval, which is an object of conducting piecewidth linear approximation (hereinafter referred to as a "processed interval data") of data of pixel values stored in the small interval memory 11. The interval division processing section 13 conducts interval division processing on processed interval data stored in the interval register 12. The term "interval division processing" here means a processing for not only dividing processed interval data at a position where the sum of accumulated square errors of pixel values in two intervals when processed interval data is divided into the two interval is minimized, but also approximating data of divided intervals by the average of pixel values in the intervals.

The division processing control section 14 recursively conducts interval division processing on small interval data stored in the small interval memory 11 using the interval division processing section 13. The division processing control section 14 recursively conducts interval division processing so that accumulated square errors of pixel values in intervals of small interval data obtained by division are a prescribed threshold value or less individually to generate one-dimensional approximation image data. The small interval approximation image memory 15 stores the one-dimensional approximation image data generated by the division processing control section 14.

Figure 4:
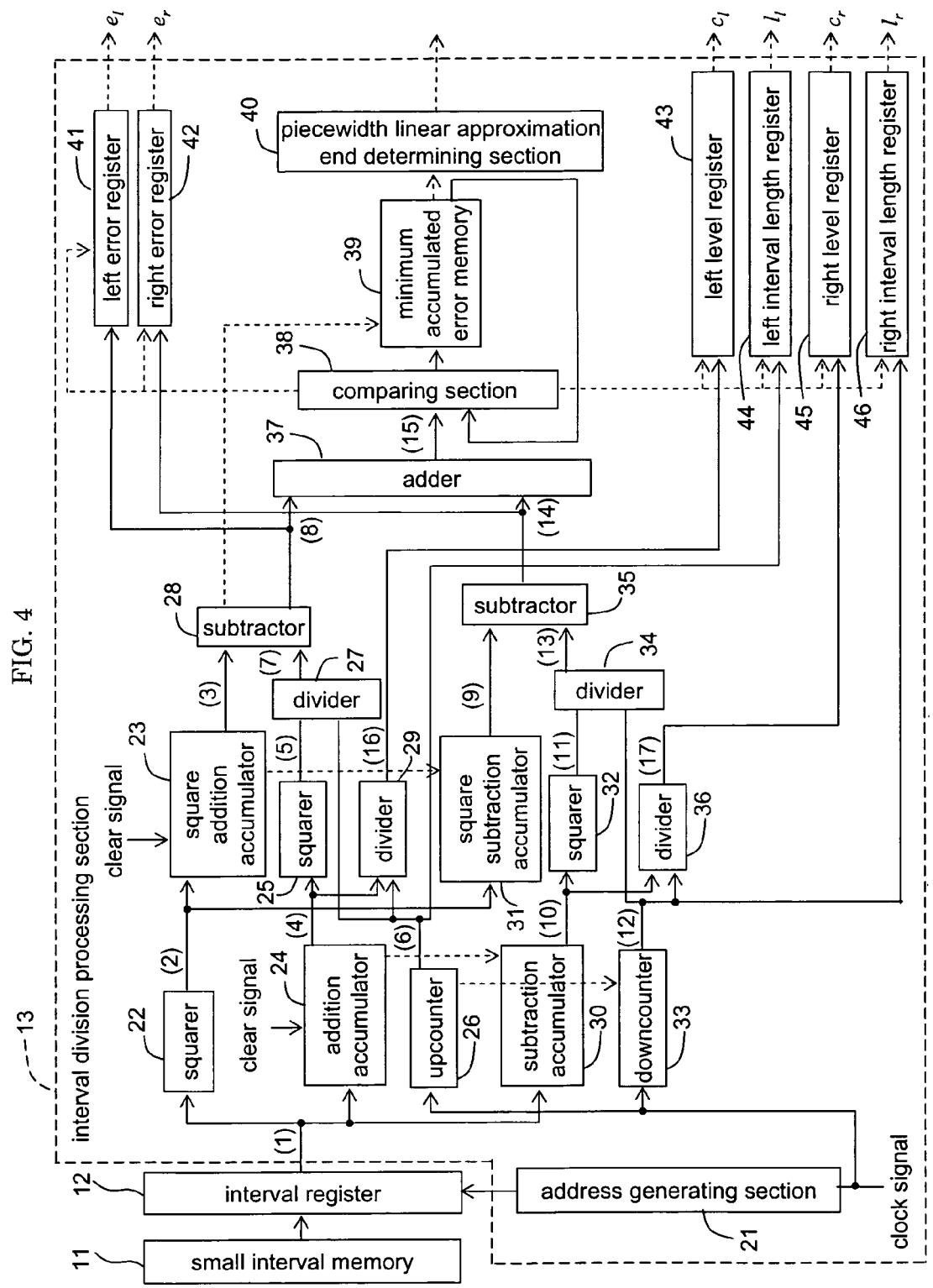
FIG. 4 is a block diagram showing a configuration of an interval division processing section 13 of FIG. 3.

FIG. 4 is a block diagram showing a configuration of the interval division processing section 13 of FIG. 3. In FIG. 4, the interval division processing section 13 includes: an address generating section 21; a squarer 22; a square addition accumulator 23; an addition accumulator 24; a squarer 25; an upcounter 26; a divider 27; a subtractor 28; a divider 29; a subtraction accumulator 30; a square subtraction accumulator 31; a squarer 32; a downcounter 33; a divider 34; a subtractor 35; a divider 36; an adder 37; a comparing section 38; a minimum accumulated error memory 39; a piecewidth linear approximation end determining section 40; a left error register 41; a right error register 42; a left level register 43; a left interval length register 44; a right level register 45; and a right interval length register 46. Description will be given of functions of the respective constituents together with operations described later.

Figure 5:
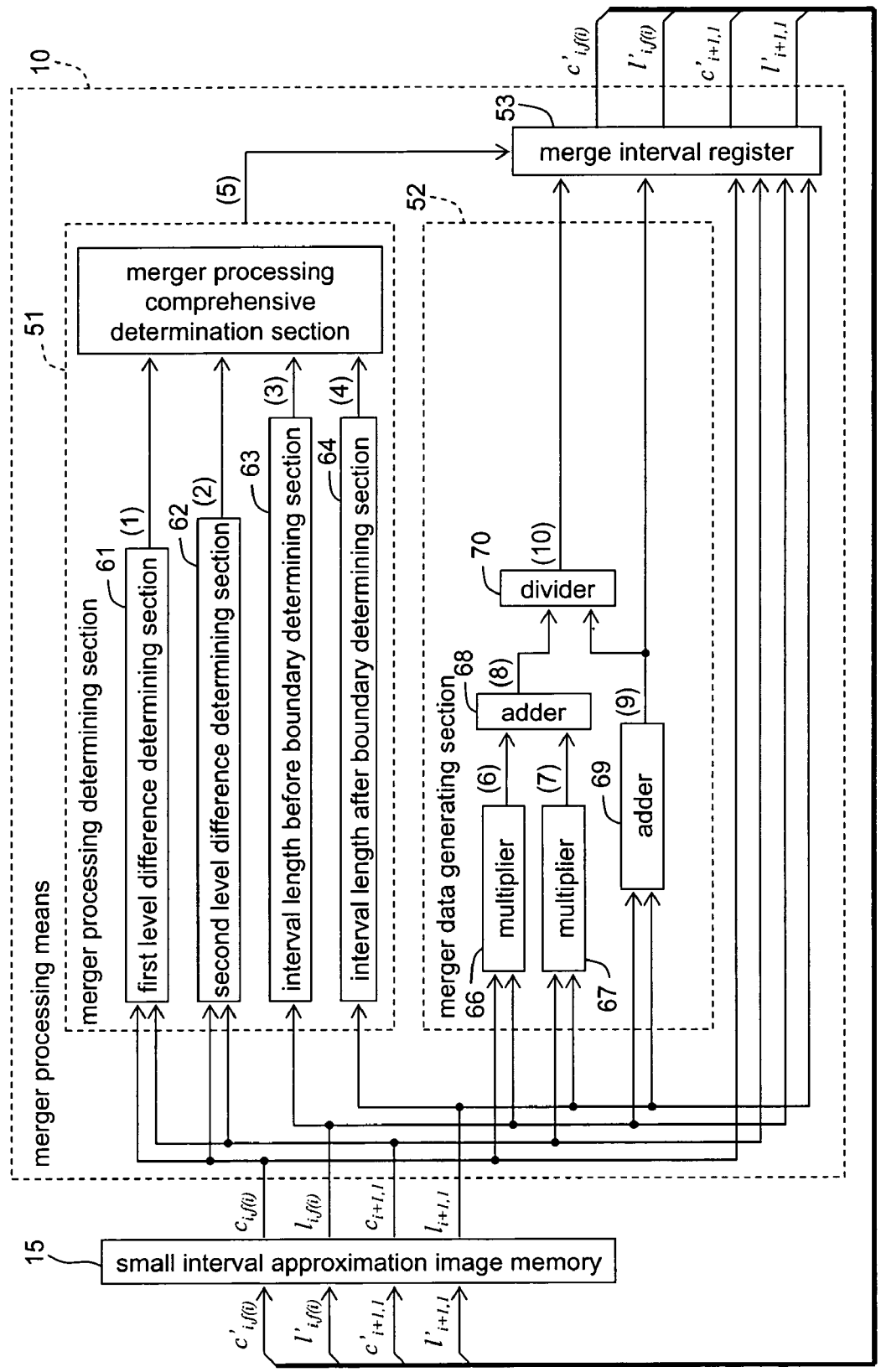
FIG. 5 is a block diagram showing a configuration of a merger processing means 10 of FIG. 2.

FIG. 5 is a block diagram showing a configuration of the merger processing means 10 of FIG. 2. In FIG. 5, the merger processing means 10 includes: a merger processing determining section 51; a merge data generating section 52; and a merge interval register 53.

The merger processing determining section 51 conducts a determination on whether or not a difference between the averages of pixel values in the intervals between the opposing ends in adjacent two small intervals is a prescribed threshold value or less and the length of one interval is a prescribed threshold value or less. The merger data generating section 52 conducts a processing in which, in connection with small interval data stored in the small interval approximation image memory 15, approximate values in the intervals between the opposing ends in adjacent two small intervals are replaced with the average value of all the pixel values in the both intervals. The merge interval register 53 temporarily stores small interval data after the merger processing.

The merger processing determining section 51 includes: a first level difference determining section 61; a second level difference determining section 62; an interval length before boundary determining section 63; an interval length after boundary determining section 64; and a merger processing comprehensive determination section 65. The merge data generating section 52 includes: two multipliers 66 and 67; two adders 68 and 69; and a subtractor 70. Description will be given of functions of the respective constituents together with operations described later.

Figure 6:
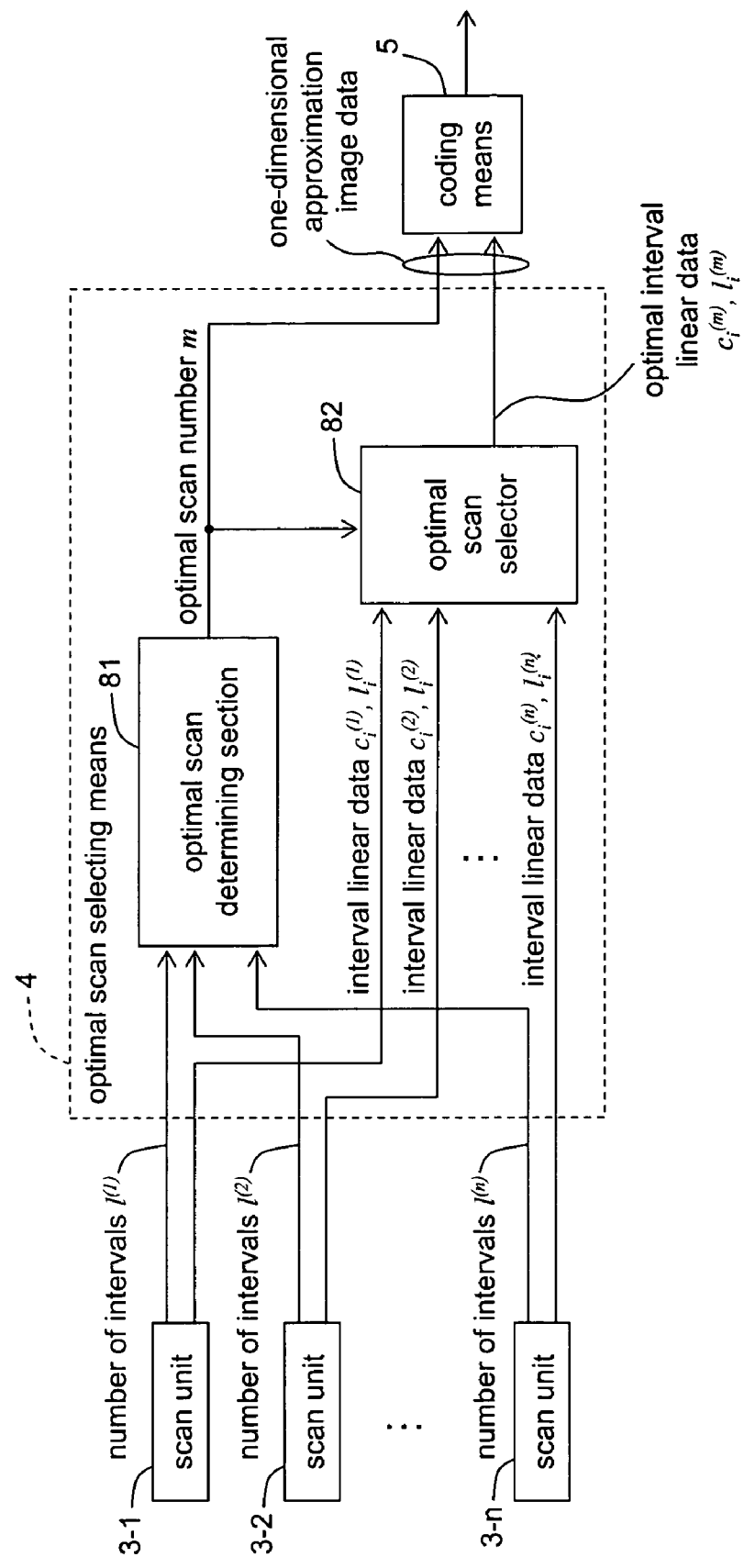
FIG. 6 is a block diagram showing a configuration of an optimal scan selecting means 4 of FIG. 1.

FIG. 6 is a block diagram showing a configuration of the optimal scan selecting means 4 of FIG. 1. In FIG. 6, the optimal scan selecting means 4 includes: an optimal scan determining section 81; and an optimal scan selector 82.

The optimal scan determining section 81 determines one-dimensional approximation image data having a minimum number of intervals among one-dimensional approximation image data on which merger processing has been conducted by the merger processing means 10 after division by the piecewidth linear approximation means 9 of each scan unit 3-$i$ ($i=1,\ldots,n$) and outputs the number m of the scan unit thereof (hereinafter referred to as an "optimal scan number"). The optimal scan selector 82 selects one-dimensional approximation image data outputted by a scan unit 3-$m$ with the optimal scan number m and outputs the data to the coding means 5.

Figure 7:
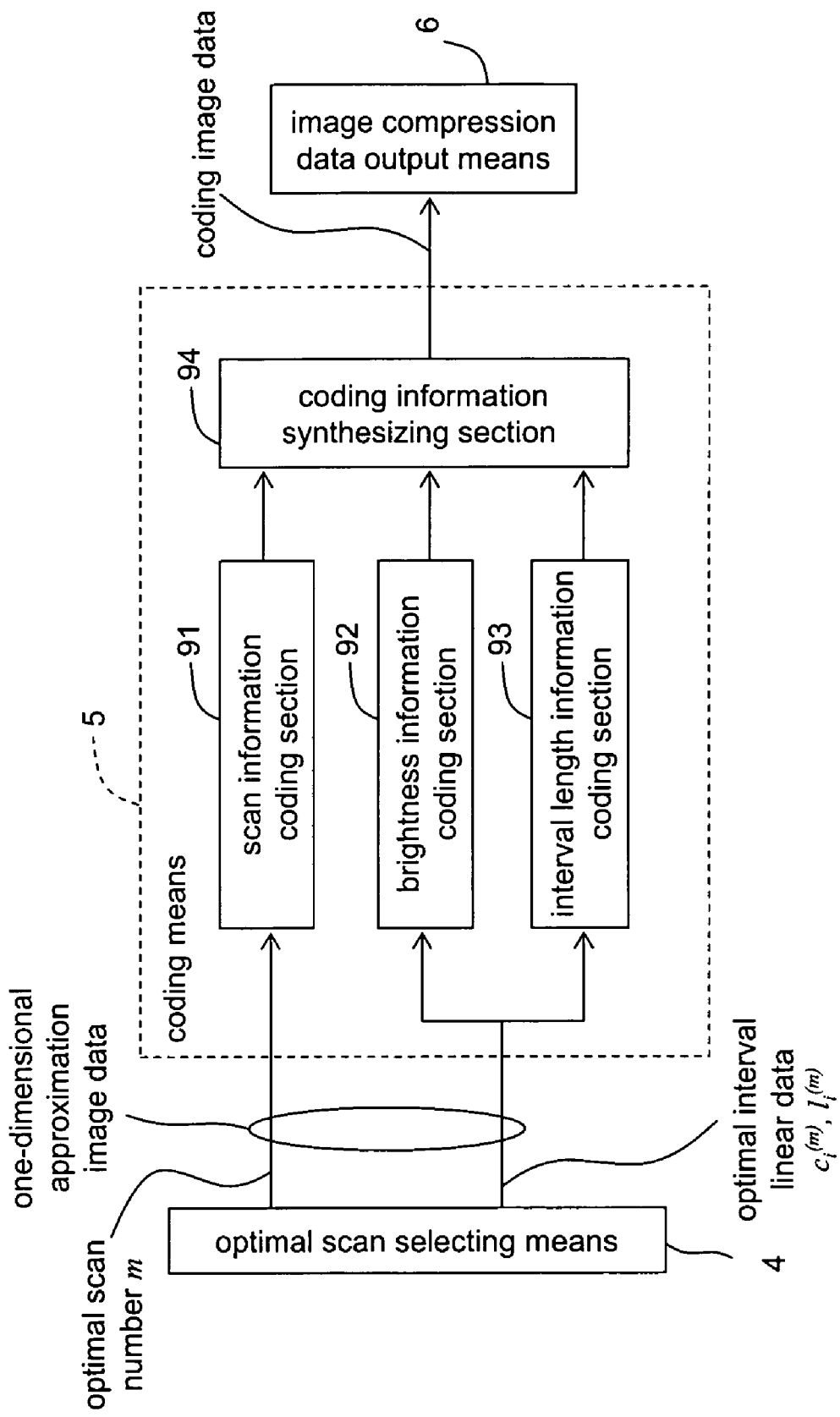
FIG. 7 is a block diagram showing a configuration of a coding means 5 of FIG. 1.

FIG. 7 is a block diagram showing a configuration of the coding means 5 of FIG. 1. In FIG. 7, the coding means 5 includes: a scan information coding section 91; a brightness information coding section 92; an interval length information coding section 93; and a coding information synthesizing section 94.

The scan information coding section 91 encodes the optimal scan number m outputted by the optimal scan selecting means 4 by means of entropy coding using Huffman code or the like based on a scan frequency. The brightness information coding section 92 encodes brightness information of each interval of one-dimensional approximation image data outputted by the optimal scan selecting means 4 by means of entropy coding using Huffman code or the like of a differential value of brightness levels. The interval length information coding section 93 encodes interval length information of each interval of one-dimensional approximation image data outputted by the optimal scan selecting means 4 by means of entropy coding using Wyle code or the like.

Figure 8:
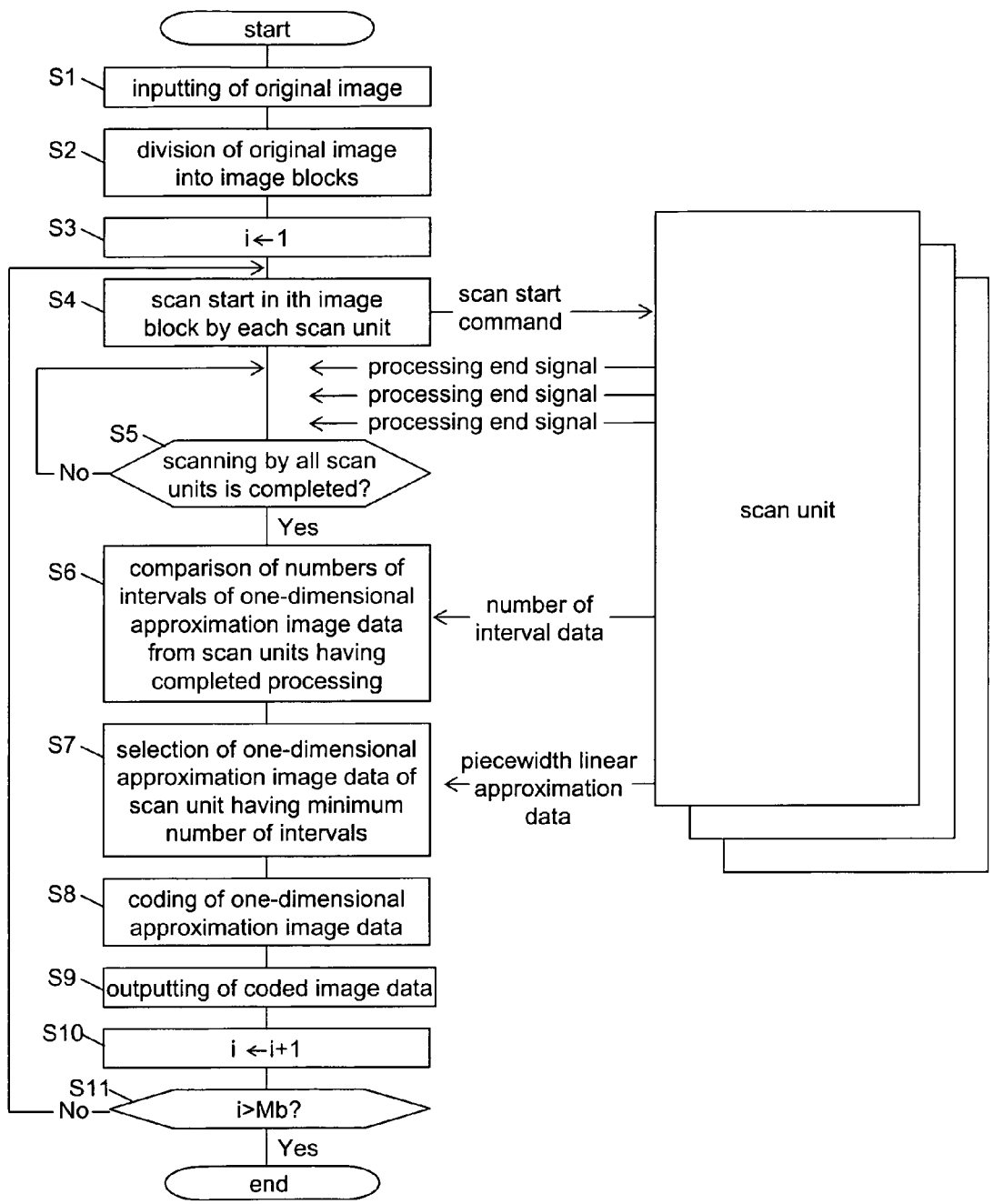
FIG. 8 is a flowchart showing a flow of all processing of the image coding method in the first embodiment.

Description will be given of an image coding method in the image coding apparatus of this embodiment with the above-described construction. FIG. 8 is a flowchart showing a flow of all processing of the image coding method in the first embodiment.

In a case where the image coding apparatus in this embodiment encodes an original image, firstly, original image data is inputted to the image input means 1 (S1). After the original image is inputted, then the image region dividing means 2 divides the original image into $M_b$ ($M_b > 1$) image blocks (S2). When division of the image is over, the image region dividing means 2 sets 1 to a parameter i showing the number of an image block, which is an object of coding (S3).

Then, the image region dividing means 2 outputs a scan start command to each scan unit 3-1 to 3-$n$ (S4). Thereby, the scan units 3-1 to 3-$n$ start scanning in image blocks and piecewidth linear approximation processing.

Each scan unit 3-1 to 3-$n$, when the piecewidth linear approximation processing is over, transmits a processing end signal to the optimal scan selecting means 4. The optimal scan selecting means 4 awaits till processing end signals are transmitted from all the scan units 3-1 to 3-$n$ (S5).

Here, in piecewidth linear approximation processing, one-dimensional original image data that is scanned with the scan means 7 and thereby one-dimensionalized is divided into plural intervals by the piecewidth linear approximation means 9 and pixel values in each interval is approximated by the average value of pixel values in the interval. On this occasion, a way to divide the interval is conducted so that accumulated square error of the pixel value in each interval is a prescribed threshold value $\sigma_{th}^2$ or less. Therefore, one-dimensional approximation image data generated by each scan unit 3-$k$ ($k=1,\ldots,n$) is data like $\{(c_i^{(k)}, l_i^{(k)}); i=1,\ldots,N_{section}^{(k)}\}$ (providing that $c_i^{(k)}$ is the average value of pixels in an interval i, $l_i^{(k)}$ is an interval length of an interval i and $N_{section}^{(k)}$ is the number of all intervals).

Figure 9:
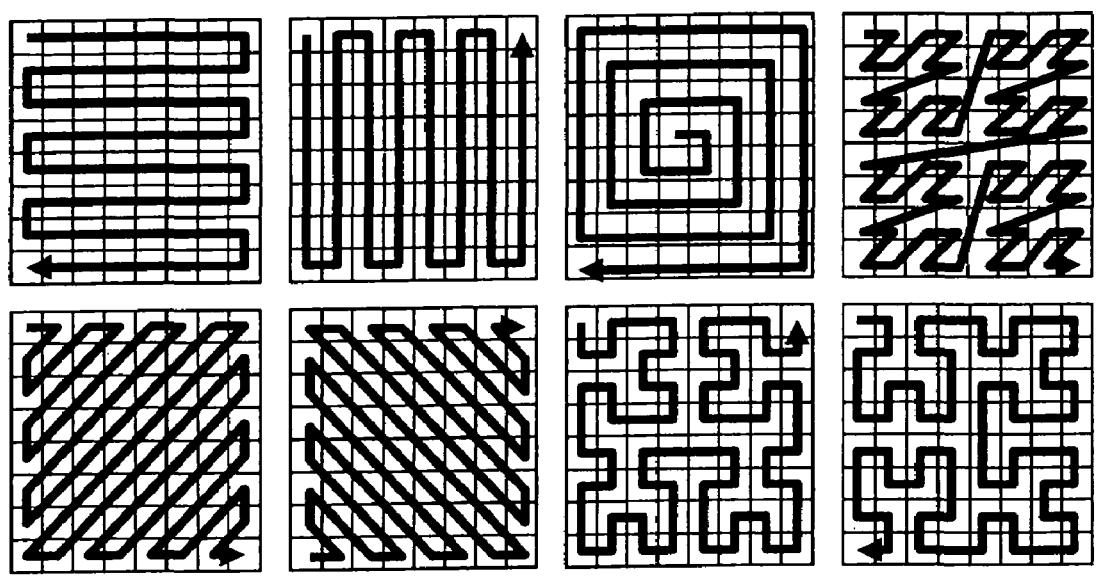
FIG. 9 is a diagram showing examples of scan sequences of a scan unit.

The scan units 3-1 to 3-$n$ scan image blocks according to respective different scan sequences. Examples of scan sequences include various kinds of scan sequences such as a raster scanning, a zigzag scanning, a spiral scanning, and Hilbert scanning, which are shown in FIG. 9.

When processing end signals are transmitted from all the scan units 3-1 to 3-$n$, the optimal scan selecting means 4 compares the numbers of intervals $N_{section}^{(k)}$ (k=1, ..., n) of one-dimensional approximation image data generated by the respective scan units 3-1 to 3-$n$ (S6) and selects one-dimensional approximation image data having a minimum number of intervals $\{(c_i^{(m)}, l_i^{(m)}); i=1, ..., N_{section}^{(m)}\}$ (m=argmin$_k$ $N_k$) (S7). Since the fewer the number of intervals $N_{section}^{(k)}$, the less the code volume of one-dimensional approximation image data, a coding efficiency is good.

In such a way, the code volume after the coding is estimated using the number of intervals $N_{section}^{(k)}$ (k=1, ..., n) of one-dimensional approximation image data obtained by piecewidth linear approximation processing at the previous stage before an image is encoded, and one-dimensional approximation image data, the code volume of which is estimated to be the minimum is selected, thereby enabling a scan sequence most suited for the attribute of an image to be selected in a short processing time. Since piecewidth linear approximation processing has a strong tendency that an edge of the image is used as a divisional point between intervals, which is described later, the sharper an edge of an image is, the better the edge of an image is retained in one-dimensional approximation image data. Therefore, in an image having a sharp edge as in an artificial image, visual distortion at an edge of an image can be suppressed to the lowest possible level.

Then, the coding means 5 encodes the selected one-dimensional approximation image data (including information on a scan sequence) by means of an ordinary scheme such as a Huffman coding scheme or a run length coding scheme (S8). Data of the i-th image block coded is outputted by the image compression data output means 6 (S9).

The image coding apparatus increments a value of a parameter i by 1 (S10) and while i is $M_b$ or less (S11), operations from steps S4 to S10 are repeated to complete coding processing on all the image blocks.

Finally, in step S11, when the parameter i exceeds $M_b$, the image coding processing is terminated.

The above sequence of operations is a flow of the overall processing for an image coding method in this embodiment and more detailed description will be given of operations in constituents of the image coding apparatus.

Figure 10:
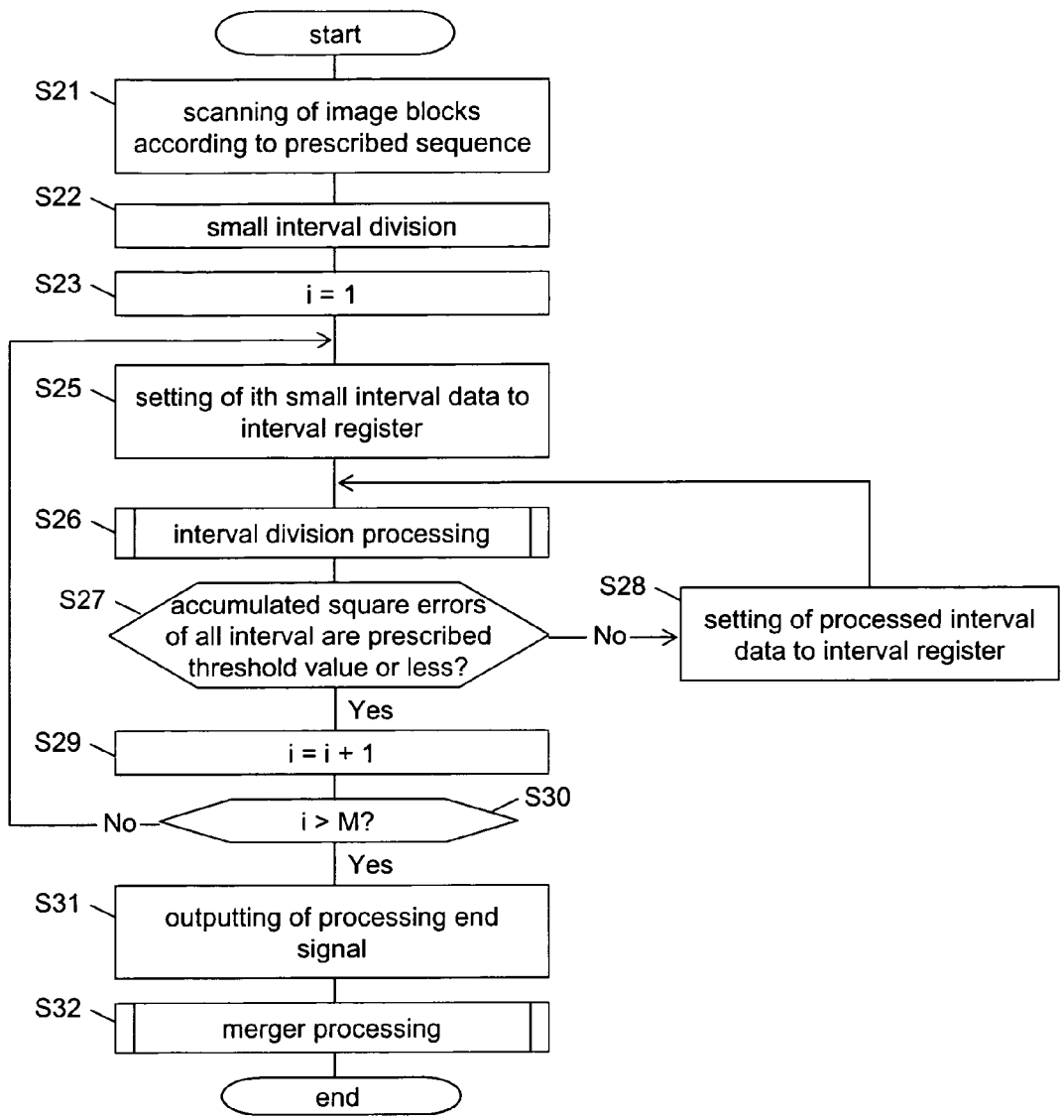
FIG. 10 is a flowchart showing data processing in a scan unit 3-$k$ (k=1, . . . , n).
Figure 11:
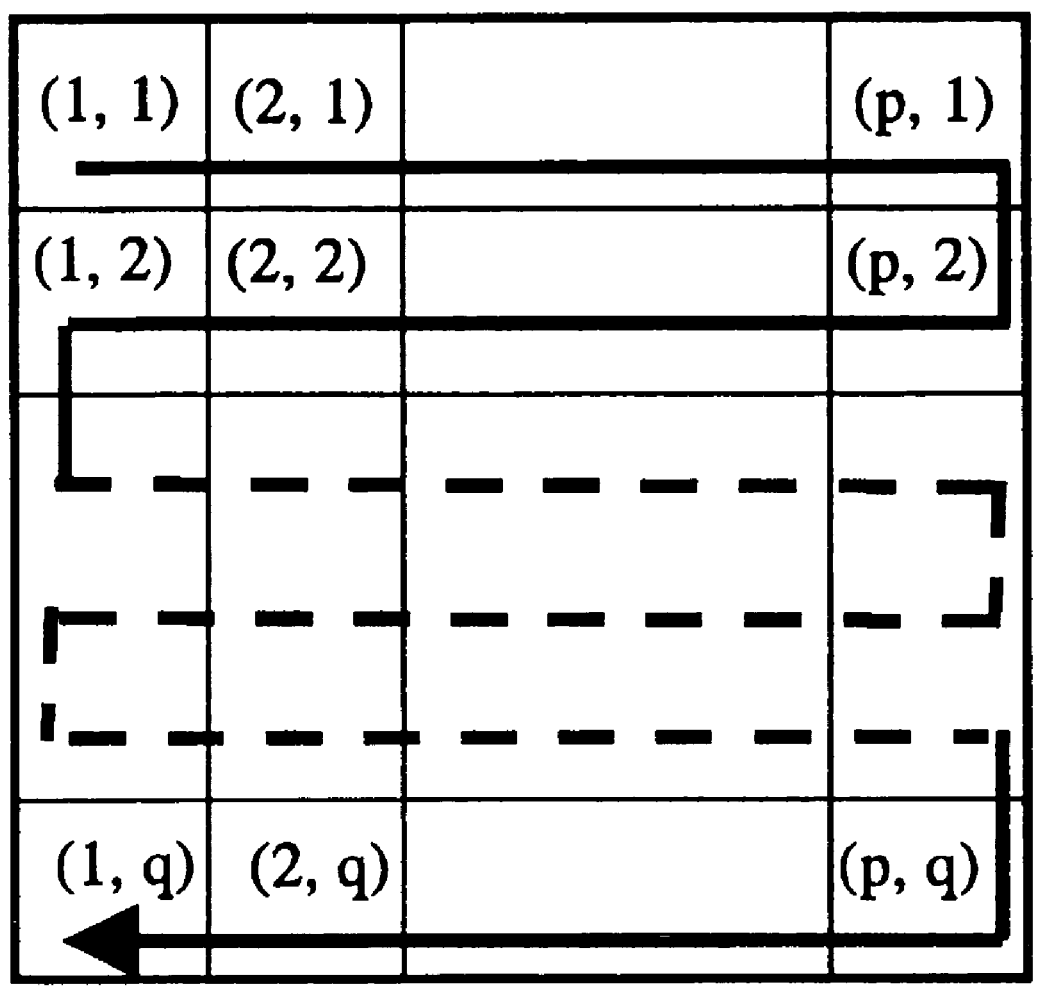
FIG. 11 is a diagram showing one example of a scan sequence in an image block.

FIG. 10 is a flowchart showing data processing in a scan unit 3-$k$ (k=1, ..., n). FIG. 11 is a diagram showing one example of a scan sequence in an image block. FIG. 12 is a representation showing contents of the image region memory 7$a$. FIG. 13 is a representation showing contents of a memory in the scan address generator 7$b$. In FIGS. 11 to 13, a size of an image block is p×q pixels. Note that in FIG. 9, there is shown scanning in a square region as an example, which can be expanded with ease by combining square region scanning or to scanning in a rectangular region obtained by deforming a square region.

In a scan unit 3-$k$, the scan means 7 firstly scans image blocks when receiving a scan start command from the image region dividing means 2 and then a one-dimensional original image is generated (S21).

In this situation, pixel values of the original image are stored in the image region memory 7$a$ in a sequence as shown in FIG. 12. The scan address generator 7$b$ has a memory to store a scan sequence. In a case where the scan unit 3-$k$ conducts a zigzag scanning as shown in FIG. 11, addresses corresponding to the image region memory 7$a$ are stored in the memory of the scan address generator 7$b$ according to a sequence of the zigzag scanning as shown in FIG. 11 in the ascending order. The scan address generator 7$b$ sequentially outputs addresses of the image region memory according to a scan sequence at clock timings. The image region memory 7$a$ outputs pixel data stored at addresses inputted from the scan address generator 7$b$. Thereby, a one-dimensional original image obtained by scanning in a prescribed sequence is generated.

Then, the small interval dividing means 8 divides the one-dimensional original image into M (M>1) equal small intervals to thereby generate small interval data (S22). The small interval division is conducted for the purpose to complete recursive interval division processing, described later, in a fewer number of operations. The small interval data is temporarily stored into the small interval memory 11 in the interior of the piecewidth linear approximation means 9.

Then, the piecewidth linear approximation means 9 sets the counter i to 1 (S23). The piecewidth linear approximation means 9 has the counter i as an internal variable. The counter i shows the number of a small interval data on which piecewidth linear approximation processing is conducted.

Then, the piecewidth linear approximation means 9 sets small interval data of the i-th small interval l to the interval register 12 (S25). The interval division processing section 13 and the division processing control section 14 conduct piecewidth linear approximation processing on the i-th small interval data (S26 to S28). The piecewidth linear approximation processing is conducted according to recursive algorithm as shown by the equation 1.

[equation 1]

```
         /* piecewidth linear approximation processing */
    1    piecewidth linear approximation processing (interval
l) {
    2    [interval l_l, l_r), accumulative square
         errors (e_{l, min}, e_{r,
    min}) ] := interval division processing (interval l)
    3    if e_{l, min} > e_{th} then
    4    piecewidth linear approximation processing (interval
l_l)
    5    endif
    6    if e_{r, min} > e_{th} then
    7    piecewidth linear approximation processing (interval
l_r)
    8    endif
    9    }
```

Here, interval division processing is processing in which an interval l is divided into intervals $l_l$ and $l_r$ at a divisional position at which accumulated square errors of pixel values in the intervals, left and right, are minimized. Detailed description will be given of the interval division processing later.

In the second line of the equation 1, interval division processing is conducted on the interval l to thereby obtain two intervals $l_l$ and $l_r$ after the division, accumulated square errors $e_{l,min}$ and $e_{r,min}$ of pixel values in the intervals and the averages $c_l$ and $c_r$ of pixel values in the intervals. Note that since in the equation 1, there is no direct relation with averages $c_l$ and $c_r$; the averages are omitted.

In the third to fifth lines of the equation 1, in the left side interval $l_l$ after division, if the accumulated square error $e_{l,min}$ of the pixel value in the interval is larger than a prescribed threshold value $e_{th}$, recursive piecewidth linear approximation processing is conducted on the interval $l_l$. On the other hand, if in the left side interval $l_l$ after division, the accumulated square error $e_{l,min}$ is a prescribed threshold value $e_{th}$ or less, no recursive piecewidth linear approximation processing is conducted on the interval $l_l$.

In the sixth to eighth lines of the equation 1, similarly in the right side interval $l_r$ after division, if the accumulated square error $e_{r,min}$ of the pixel value in the interval is larger than a prescribed threshold value $e_{th}$, recursive piecewidth linear approximation processing is conducted on the interval $l_r$. On the other hand, if in the right side interval $l_r$ after division, the accumulated square error $e_{r,min}$ is a prescribed threshold value $e_{th}$ or less, no recursive piecewidth linear approximation processing is conducted on the interval $l_r$.

With the piecewidth linear approximation processing described above adopted, the i-th small interval data is further divided into small interval one-dimensional approximation image data constituted of f(i) intervals. Accumulated square errors of pixel values in the intervals are suppressed to a prescribed threshold value $e_{th}$ or less. Therefore, since in a case where a sharp edge of an image is included in an interval, the accumulated square error in the interval cannot be suppressed to a prescribed threshold value $e_{th}$ or less, division is conducted at the edge portion so that a sharp edge of an image is not included in an interval. That is, an edge of an image is retained as a boundary of an interval by the piecewidth linear approximation processing.

Note that the interval division processing is conducted by the interval division processing section 13 and control of recursive processing as described above is conducted by the division processing control section 14. As to an interval on which an approximate value is definitely determined by piecewidth linear approximation processing, the interval length and the average of pixel values are stored in the small interval approximation image memory 15.

When piecewidth linear approximation processing on the i-th small interval data is over, the piecewidth linear approximation means 9 increments a value of the counter i by 1 (S29). If an i value is not larger than M (S30), a process from steps S25 to S29 is again repeated.

On the other hand, if i>M in step S30, the piecewidth linear approximation means 9 transmits a processing end signal to the optimal scan selecting means 4 (S31). Then, merger processing is conducted in the last small interval at the end (S32) and the scan unit 3-$k$ ends data processing.

Figure 14:
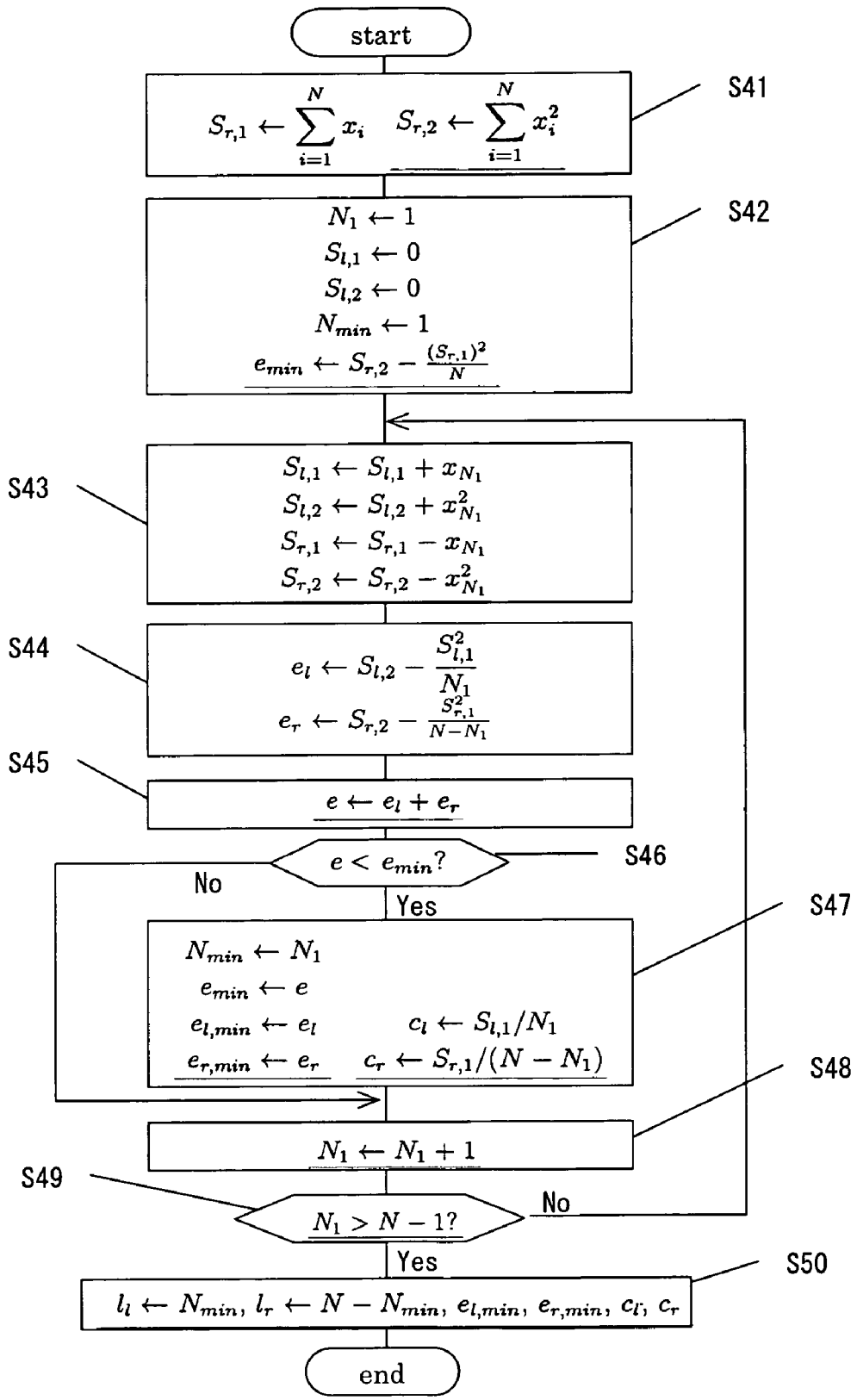
FIG. 14 is a flowchart showing interval division processing by an interval division processing section 13 of FIG. 3 or 4.

Supplemental description will be given of interval division processing. FIG. 14 is a flowchart showing interval division processing by the interval division processing section 13 of FIG. 3 or 4. FIG. 15 is a representation showing operational outputs at nodes of FIG. 14.

When N processed interval data $\{x_i; i=1, \ldots, N\}$ as interval lengths are set in the interval register 12, clear signals are inputted to the square addition accumulator 23 and the addition accumulator 24 to thereby clear accumulated values of both accumulators to 0. The upcounter 26 is also reset. The address generating section 21 increases an address value inputted to the interval register 12 by 1 in the ascending order at each clock. In company therewith, a pixel value $x_i$ is outputted to the node (1), which is an output of the interval register 12, at a clock value i ($1 \leq i \leq N$).

The squarer 22 outputs a value $x_i^2$ obtained by squaring a pixel value $x_i$ inputted from the node (1) to a node (2). The square addition accumulator 23 accumulates output values of the node (2) at each clock. Hence, when a clock value is i ($1 \leq i \leq N$), $\Sigma_{k=1}^{i} x_k^2$ is stored in the square addition accumulator 23 as an accumulated value.

In a similar way, the addition accumulator 24 accumulates output values of the node (1) at each clock. Hence, when a clock value is i ($1 \leq i \leq N$), $\Sigma_{k=1}^{i} x_k$ is stored in the addition accumulator 24 as an accumulated value.

The upcounter 26 counts the number of clocks and when a clock value is i ($1 \leq i \leq N$), i is outputted to a node (6).

When a clock value i changes from 1 to N, $S_{r,1}$ value of the equation 2 is stored into the addition accumulator 24 and $S_{r,2}$ value of the equation 3 is stored into the square addition accumulator 23. A count value of the upcounter 26 is N.

$$S_{r,1} = \sum_{i=1}^{N} x_i \qquad \text{[the equation 2]}$$

$$S_{r,2} = \sum_{i=1}^{N} x_i^2 \qquad \text{[the equation 3]}$$

When a clock value is N+1, values of the addition accumulator 24 and the square addition accumulator 23 are set to the subtraction accumulator 30 and the square subtraction accumulator 31. That is, at a clock value N+1, $S_{r,1}$ and $S_{r,2}$ shown by the equations 2 and 3 are set to the subtraction accumulator 30 and the square subtraction accumulator 31, respectively, and the values are outputted to the nodes (10) and (9) (S41).

At the same time as that, clear signals are inputted to the addition accumulator 24 and the square addition accumulator 23 to again clear accumulated values of both accumulators to 0. A count value N of the upcounter 26 is set to the down counter 33 and outputted to anode (12). The upcounter 26 is again reset. An address value generated by the address generating section 21 is also reset (S42). At this time point, a value of the left interval length register 44 is set to 0, a value of the right interval length register 46 is set to N and a value of the equation 4 is set to the minimum accumulated error memory 39, all being as an initial value.

$$e_{min} = S_{r,2} - \frac{(S_{r,1})^2}{N} \qquad \text{[the equation 4]}$$

As a clock value increases by 1 at a time from N+1, the address generating section 21 increases an address value inputted to the interval register 12 by 1 in the ascending order at each clock. In company therewith, a pixel value $x_{N1}$ is outputted to the node (1), which is the output of the interval register 12, when a clock value is $N+N_1+1$ ($1 \leq N_1 \leq N-1$). $X_{N1}^2$, $S_{l,2} = \Sigma_{k=1}^{N1} x_k^2$, $S_{l,1} = \Sigma_{k=1}^{N1} x_k$ and $N_1$ are outputted to the nodes (2), (3), (4) and (6), respectively. The square adder 25 outputs a value $S_{l,1}^2 = (\Sigma_{k=1}^{N1} x_k)^2$ obtained by squaring an output value of the node (4) to the node (5). The divider 27 outputs a value $S_{l,1}^2/N_1$ obtained by dividing an output value of the node (5) by an output value of the node (6). The divider 29 outputs a value $S_{l,1}^2/N_1$ obtained by dividing an output value of the node (4) by an output value of the node (6) to a node (16). This is the average value of pixel values in the left side interval with a length $N_1$. The subtractor 28 outputs a value (equation 5) obtained by subtracting an output value of the node (7) from an output value of the node (3) to a node (8).

$$e_l = S_{l,2} - \frac{(S_{l,1})^2}{N_1} \qquad \text{[the equation 5]}$$

The square subtraction accumulator 31 subtracts an output value of the node (2) from a set value at each clock and outputs the result to the node (9). Hence, when a clock value is $N+N_1+1$ ($1 \leq N_1 \leq N-1$), $S_{r,2} = \sum_{k=N1+1}^{N} x_k^2$ is outputted to the node (9). The subtraction accumulator 30 subtracts an output value of the node (1) from a set value at each clock to output the result to a node (10). Hence, when a clock value is $N+N_1+1$ ($1 \leq N_1 \leq N-1$), $S_{r,1} = \sum_{k=N1+1}^{N} x_k$ is outputted to the node (10). The squarer 32 outputs a value $S_{r,1}^2$ obtained by squaring an output value of the node (10) to a node (11). On the other hand, as a clock value increases from N+1 by 1, the downcounter 33 decreases at each additional clock by 1 from a set value N. Hence, when a clock value is $N+N_1+1$ ($1 \leq N_1 \leq N-1$), $N-N_1$ is outputted to a node (12). Therefore, the divider 34 outputs a value $S_{r,1}^2/(N-N_1)$ obtained by dividing an output value of the node (11) by an output value of the node (12) to a node (13) (S44). The subtractor 35 outputs a value (equation 6) obtained by subtracting a value of the node (13) from a value of the node (9) to a node (14).

$$e_r = S_{r,2} - \frac{S_{r,1}^2}{N - N_1}$$ [the equation 6]

The divider 36 outputs a value $S_{r,1}/(N-N_1)$ obtained by dividing an output value of the node (10) by an output value of a node (12) to a node (17). This is the average value of pixel values in the right side interval with a length $N-N_1$.

The adder 37 outputs a value (equation 7) obtained by adding an output value of the node (8) to an output value of a node (14) to a node (15) (S45). This is the sum of accumulated square errors of the left and right intervals.

$$e = e_l + e_r$$ [the equation 7]

The comparing section 38 compares an output value e of the node (15) with a determined vale $e_{min}$ stored in the minimum accumulated error memory 39 (S46). If $e < e_{min}$, the comparing section 38 updates a value of the determined value $e_{min}$ stored in the minimum accumulated error memory to an output value e of the node (15). At the same time as that, the comparing section 38 sets the left error register 41, the right error register 42, the left level register 43, the right level register 45, the left interval length register 44 and the right interval length register 46 temporarily to a written state. Thereby, output values $e_{l,min}$ and $e_{r,min}$ of the nodes (8) and (14) are captured and stored in the left error register 41 and the right error register 42, respectively. Then, the average values (equation 8 and equation 9) of pixel values of the left and right intervals are captured and stored into the left level register 43 and the right level register 45, respectively.

$$c_l = S_{l,1}/N_1$$ [the equation 8]

$$C_r = S_{r,1}/(N-N_1)$$ [the equation 9]

Output values $l_l = N_1$ and $l_r = N - N_1$ of the nodes (6) and (12) are captured and stored into the left interval length register 44 and the right interval length register 46 (S47), respectively.

Then, a counter value $N_1$ of the upcounter 26 increases by 1 at the next clock (S48). The piecewidth linear approximation end determining section 40 determines whether or not a counter value $N_1$ exceeds N−1 (S49) and the operations in steps from S43 to S48 are repeated till the counter value exceeds N−1.

Therefore, while a divisional point is moved from the left side to the right side of processed interval data, retrieval is made all over the interval prior to the division on a divisional point where the sum of the accumulated square errors in the both intervals obtained by division is minimized. When the retrieval all over the interval is over, the accumulated square error values $e_{l,min}$ and $e_{r,min}$ of the left and right intervals, the average values $c_l$ and $c_r$ of pixel values and the lengths $l_l$ and $l_r$ of the intervals at a divisional point where the sum of accumulated square errors in the both intervals is minimized are retained in the left error register 41, the right error register 42, the left level register 43, the right level register 45, the left interval length register 44 and the right interval length register 46.

Therefore, when the above processing ends, the interval division processing section 13 outputs the values retained in the registers (S50) to the division processing control section 14 to terminate the operation.

Figure 16:
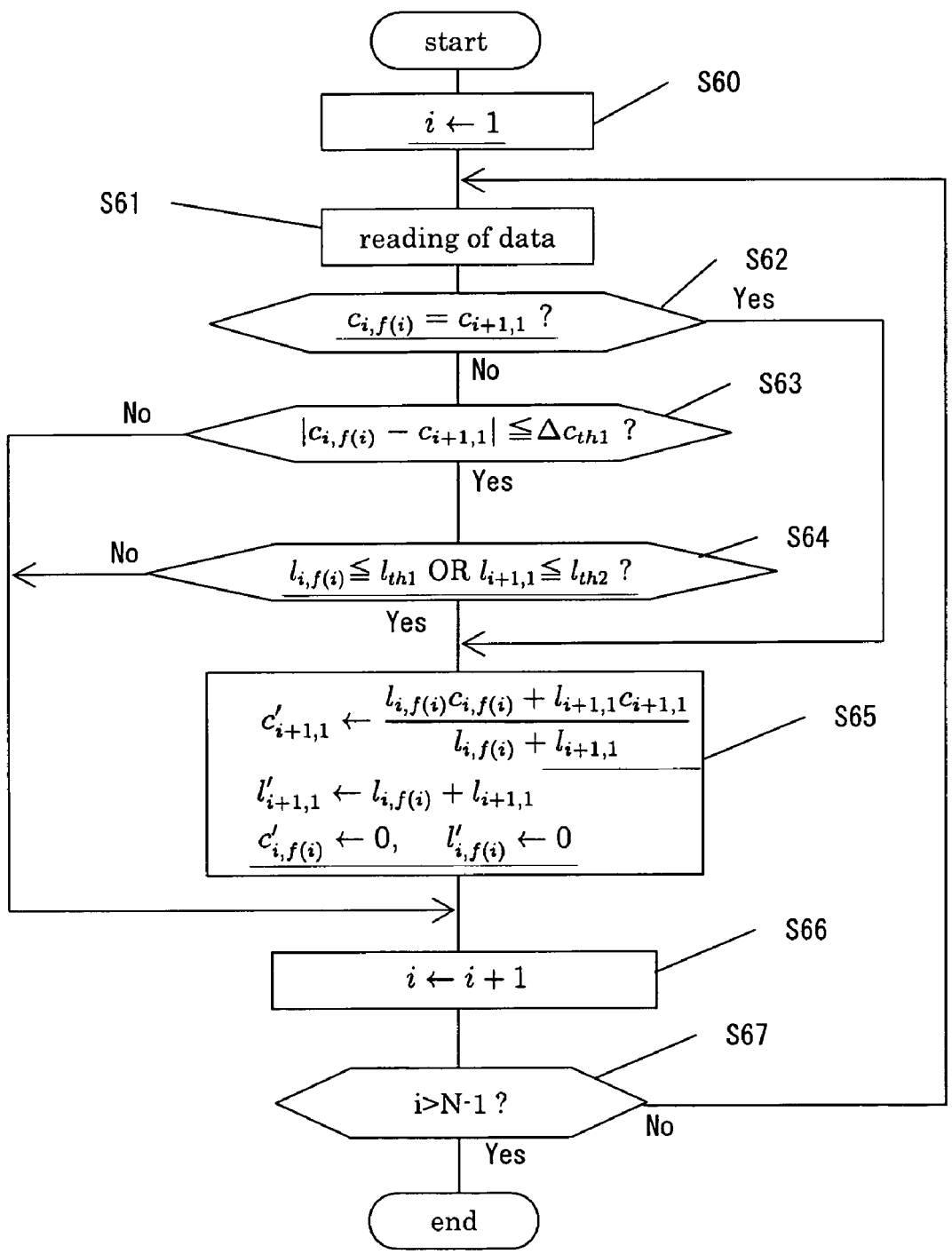
FIG. 16 is a flowchart showing operations in merger processing by a merger processing means.

Finally, supplemental description will be given of merger processing by the merger processing means. FIG. 16 is a flowchart showing operations in merger processing by a merger processing means. FIG. 17 is a representation showing contents of the small interval approximation image memory 15.

The merger processing is a processing to merge two intervals under a prescribed condition adapted to a level difference between the intervals at the merge boundary and the lengths thereof in a case where division into small interval data is conducted by the small interval dividing means 8 in order to decrease an operational volume in recursive processing of piecewidth linear approximation processing and M small interval one-dimensional approximation image data generated by the piecewidth linear approximation processing are again merged. With the processing adopted, a code volume is further reduced to thereby increase a coding efficiency.

As the precondition, a situation is assumed in such a way that piecewidth linear approximation processing on M small interval data of image blocks is completed and M small interval one-dimensional approximation image data are stored in the small interval approximation image memory 15 as shown in FIG. 17. The merger processing is conducted between the last interval (the f(i) th interval) in the i-th small interval, where (i=1, ..., N−1), and the first interval (the 1st interval) in the i+1th small interval.

In the merger processing, the merger processing means 10 reads a pixel value $c_{i,f(i)}$ and the interval length $l_{i,f(i)}$ of the last interval (the f(i) th interval) in the i-th small interval, where (i=1, ..., N−1), a pixel value $c_{i+1, 1}$ and the interval length $l_{i+1,1}$ of the first interval (the 1st interval) in the i+1th small interval (S61).

The first level difference determining section 61 of the merger processing determining section 51 determines whether or not the pixel values $c_{i,f(i)}$ and $c_{i+1, 1}$ are the same as each other (S62) and if both are the same, 1 is outputted to the node (1), while not the same, 0 is outputted to the node (1).

The second level difference determining section 62 determines whether or not the absolute value of a difference between the pixel values $c_{i,f(i)}$ and $c_{i+1, 1}$ is a prescribed threshold value $\Delta c_{th}$ or less (S63) and if $|c_{i,f(i)} - c_{i+1, 1}| \leq \Delta c_{th}$, 1 is outputted to the node (2), while if $|c_{i,f(i)} - c_{i+1, 1}| > \Delta c_{th}$, 0 is outputted to the node (2).

The interval length before boundary determining section 63 determines whether or not the interval length $l_{i,f(i)}$ is a prescribed threshold value $l_{th1}$ or less and the interval length after boundary determining section 64 determines whether or not the interval length $l_{i+1,1}$ is a prescribed threshold value $l_{th2}$ or less (S64). If $l_{i,f(i)} \leq l_{th1}$ and $l_{i+1,1} \leq l_{th2}$, 1 is outputted to the nodes (3) and (4), respectively, while if $l_{i,f(i)} > l_{th1}$ and $l_{i+1,1} > l_{th2}$, 0 is outputted to the nodes (3) and (4), respectively.

The merger processing comprehensive determination section 65 performs a logic operation of (1)∨((2)∧((3)∨(4))) on logic values outputted to the nodes (1) to (4) and a result of the operation is outputted to the node (5). That is, if the value at the node (5) is 1, it is determined that both intervals are subjected to merger processing, while if the value at the node (5) is 0, it is determined that both intervals are not subjected to merger processing.

Here, supplemental description is given of the determination method. If the pixel values $c_{i,f(i)}$ and $c_{i+1,1}$ of both intervals are the same as each other, no specific problem arises in merger of both intervals. In a case where the pixel values $c_{i,f(i)}$ and $c_{i+1,1}$ are not the same as each other and if the absolute value $|c_{i,f(i)}-c_{i+1,1}|$ of a difference between the pixel values $c_{i,f(i)}$ and $c_{i+1,1}$ of both intervals is large, there is a possibility that the boundary is an edge of the image; therefore, both intervals should not be merged. This is determined with the threshold value $\Delta c_{th}$.

On the other hand, even in a case where the absolute value $|c_{i,f(i)}-c_{i+1,1}|$ of a difference between the pixel values $c_{i,f(i)}$ and $c_{i+1,1}$ of both intervals is small, if the lengths of both intervals are long, and approximation error accumulated square errors in the both intervals is increased by merger, the errors are strongly recognized when viewed. Therefore, even in a case where the absolute value $|c_{i,f(i)}-c_{i+1,1}|$ of a difference is small, no merger is conducted if the lengths of both intervals is long. This is determined with the threshold values $l_{th1}$ and $l_{th2}$.

As a result, if 1 is outputted as an output value at the node (5), a merger processing is conducted between both intervals by the merger data generating section 52 (S65). The multiplier 66 of the merge data generating section 52 determines a product of $c_{i,f(i)}$ and $l_{i,f(i)}$ and outputs the result to the node (6). The multiplier 67 determines a product of $c_{i+1,1}$ and $l_{i+1,1}$ and outputs the result to the node (7). The adder 68 adds the output value at the node (6) to the output value at the node (7) and outputs the result to the node (8). The adder 69 adds $l_{i,f(i)}$ to $l_{i+1,1}$ and outputs the result (equation 10) to the node (9).

$$l'_{i+1,1} = l_{i,f(i)} + l_{i+1,1} \quad \text{[the equation 10]}$$

The divider 70 divides the output value of the node (8) by the output value of the node (9) and outputs the result (equation 11) to the node (10).

$$c'_{i+1,1} = \frac{l_{i,f(i)} c_{i,f(i)} + l_{i+1,1} c_{i+1,1}}{l_{i,f(i)} + l_{i+1,1}} \quad \text{[the equation 11]}$$

The sum $l'_{i+1,1}$ of the interval lengths of both intervals and the average value $c'_{i+1,1}$ of pixel values of the both intervals, which are obtained in such a way, are stored in the merge interval register. If 1 is outputted to the node (5) by the merger processing comprehensive determination section 65, the value ($c_{i+1,1}$ and $l_{i+1,1}$) of the first interval of the i+1th small interval data of the small interval approximation image memory 15 is updated to ($c'_{i+1,1}$ and $l'_{i+1,1}$). Besides, the value ($c_{i,f(i)}$ and $l_{i,f(i)}$) of the last interval of the i-th small interval data of the small interval approximation image memory 15 is updated with (0,0), being subjected to an invalidity processing.

Note that while in this embodiment, accumulated square error is used as an evaluation criterion for whether or not an interval is divided in piecewidth linear approximation processing, a dispersion value can also be used instead of the accumulated square error.

Second Embodiment

In the first embodiment, the optimal scan selecting means 4 awaits, in step S5 of FIG. 8, till processing end signals are transmitted by all the scan units 3-1 to 3-n, whereas if processings by all the scan units 3-1 to 3-n awaits with one accord in this way, a processing time is determined by scanning according to a scan sequence requiring the longest time in piecewidth linear approximation processing, slowing a processing speed. On the other hand, a time requiring for piecewidth linear approximation processing is longer with a more number of intervals obtained by division in the processing.

Therefore, in step S5 of FIG. 8 of this embodiment, piece width linear approximation processing of scan units of which piecewidth linear approximation processing is not yet completed is terminated when piecewidth linear approximation processing of a prescribed number $n_1$ of scan units is completed.

Figure 18:
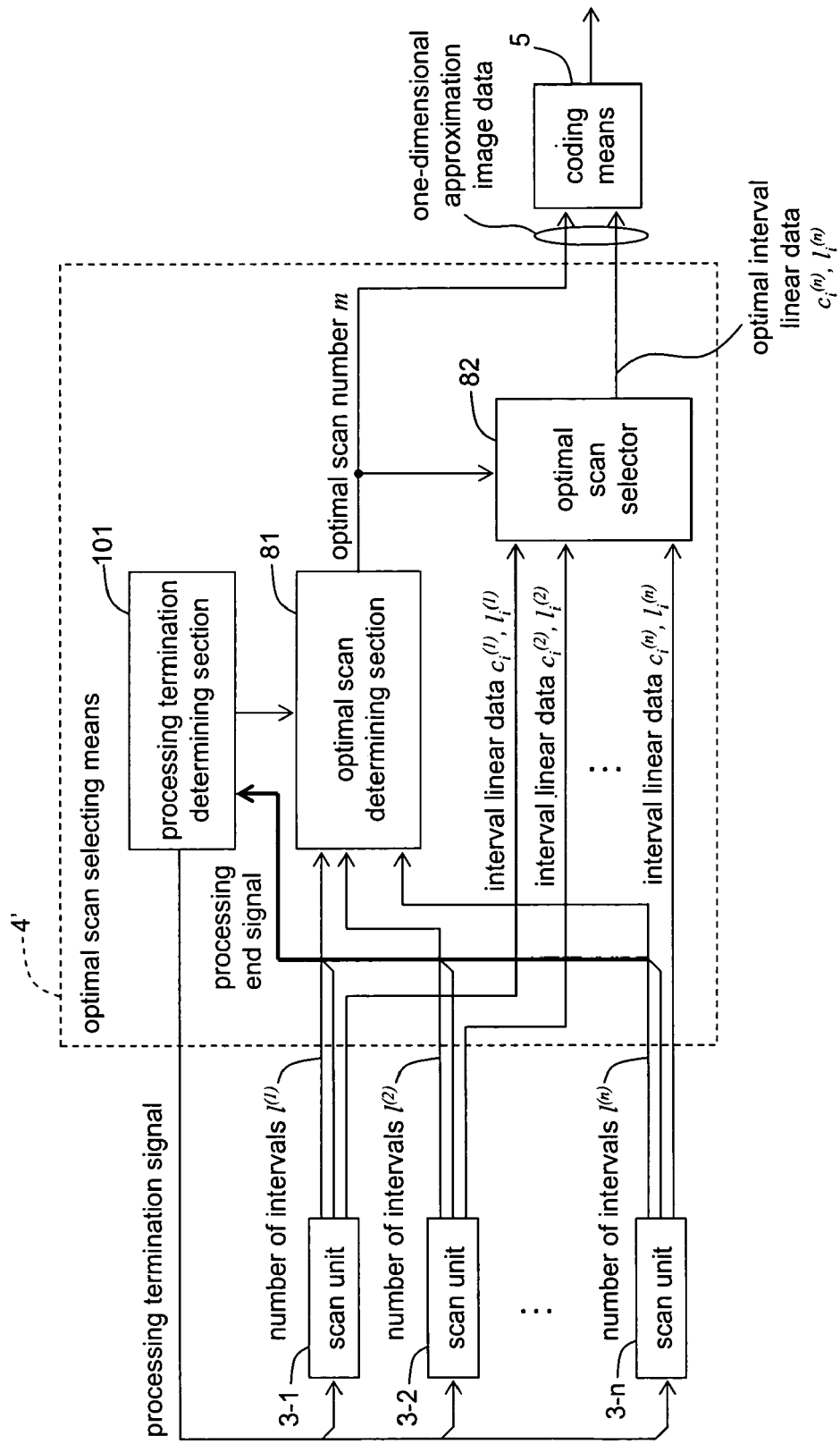
FIG. 18 is a block diagram showing an optimal scan selecting means 4' of an image coding apparatus concerning a second embodiment.
Figure 19:
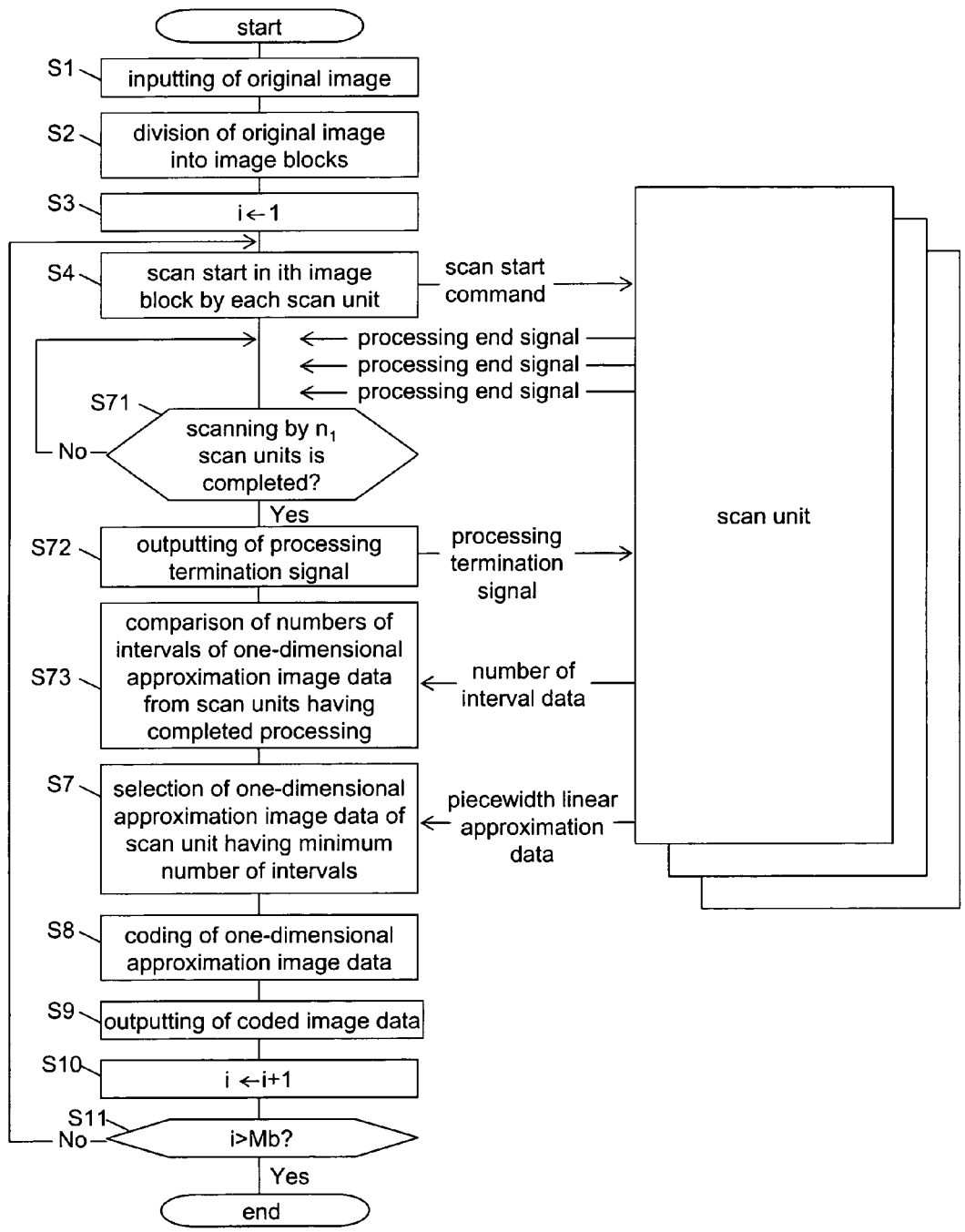
FIG. 19 is a flowchart showing an image coding method concerning the second embodiment.
Figure 20:
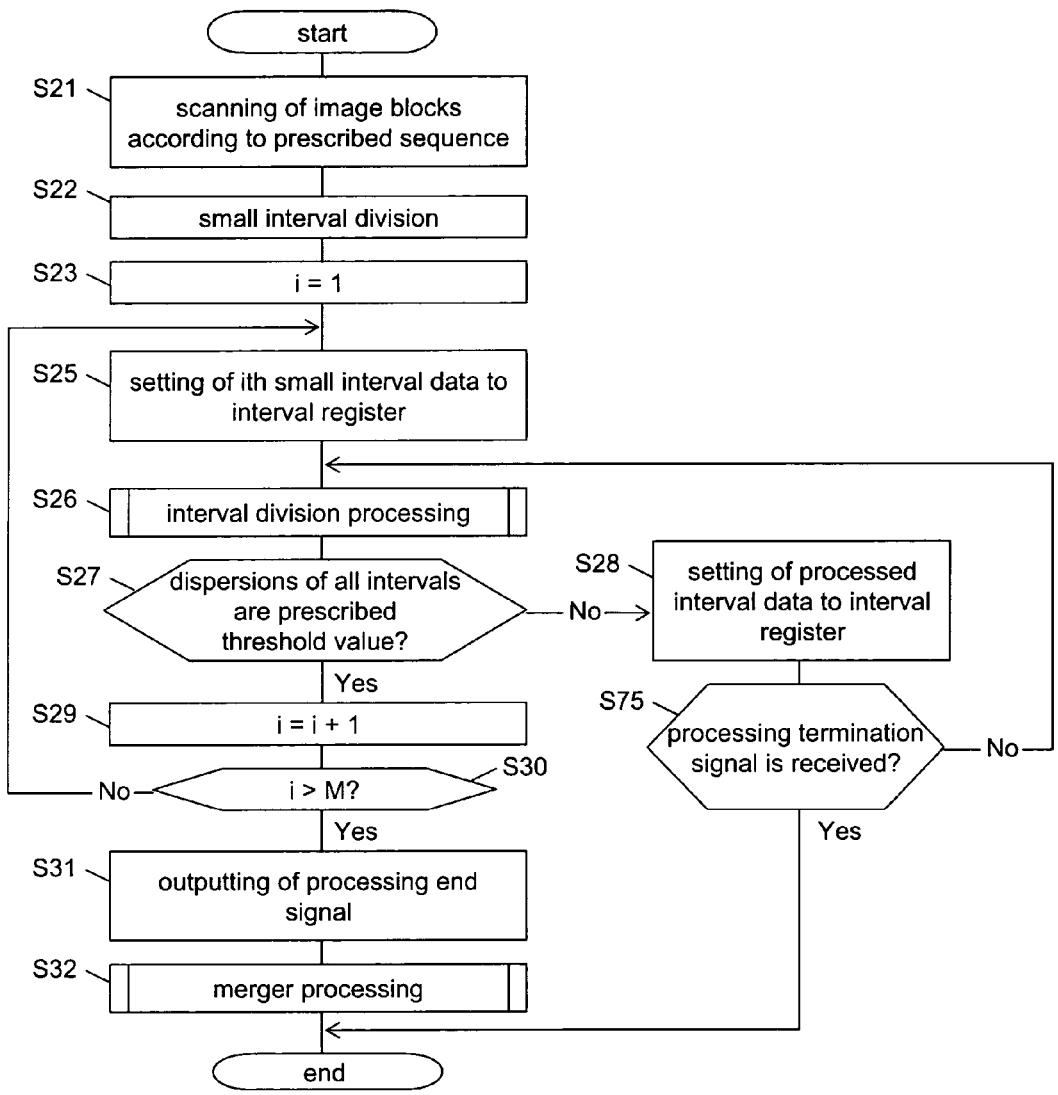
FIG. 20 is a flowchart showing operations in an operation unit of the image coding apparatus of a second embodiment.

FIG. 18 is a block diagram showing an optimal scan selecting means 4' of an image coding apparatus concerning the second embodiment. FIG. 19 is a flowchart showing an image coding method concerning the second embodiment. FIG. 20 is a flowchart showing operations in an operation unit of the image coding apparatus of the second embodiment.

The optimal scan selecting means 4' concerning the second embodiment includes a processing termination determining section 101. Note that since the other parts of the construction are similar to those described in the first embodiment, description thereof is omitted.

The processing termination determining section 101, as shown in FIG. 19, counts the number of processing end signals outputted from the scan units 3-1 to 3-n and outputs a processing termination signal (S72) when the number of processing end signals outputted exceeds a prescribed threshold value $n_1$ (S71). An optimal scanning determining section 81 selects one-dimensional approximation image data having a minimum number of intervals among operation units having already outputted a processing end signal when the processing termination determining section 101 outputs the processing termination signal (S73). The other operations are similar to those in the case of the first embodiment.

On the other hand, as shown in FIG. 20, the piecewidth linear approximation means 9 of each of the scan units 3-1 to 3-n forcibly terminates piecewidth linear approximation processing in a case where piecewidth linear approximation processing is not completed when the processing termination signal is received (S75).

In such a way, the process moves to coding processing when piecewidth linear approximation processing of first $n_1$ scan units is completed without awaiting completion of piecewidth linear approximation processing of all the scan units 3-1 to 3-n, thereby enabling a high speed image coding processing to be achieved without decreasing a coding efficiency.

Note that while in this embodiment, the processing termination determining section 101 outputs a processing termination signal when piecewidth linear approximation processing of first $n_1$ scan units is completed, another construction can also be adopted in which the processing termination determining section 101 outputs a processing termination signal when a prescribed time elapses after a first processing end signal is received.

Figure 21:
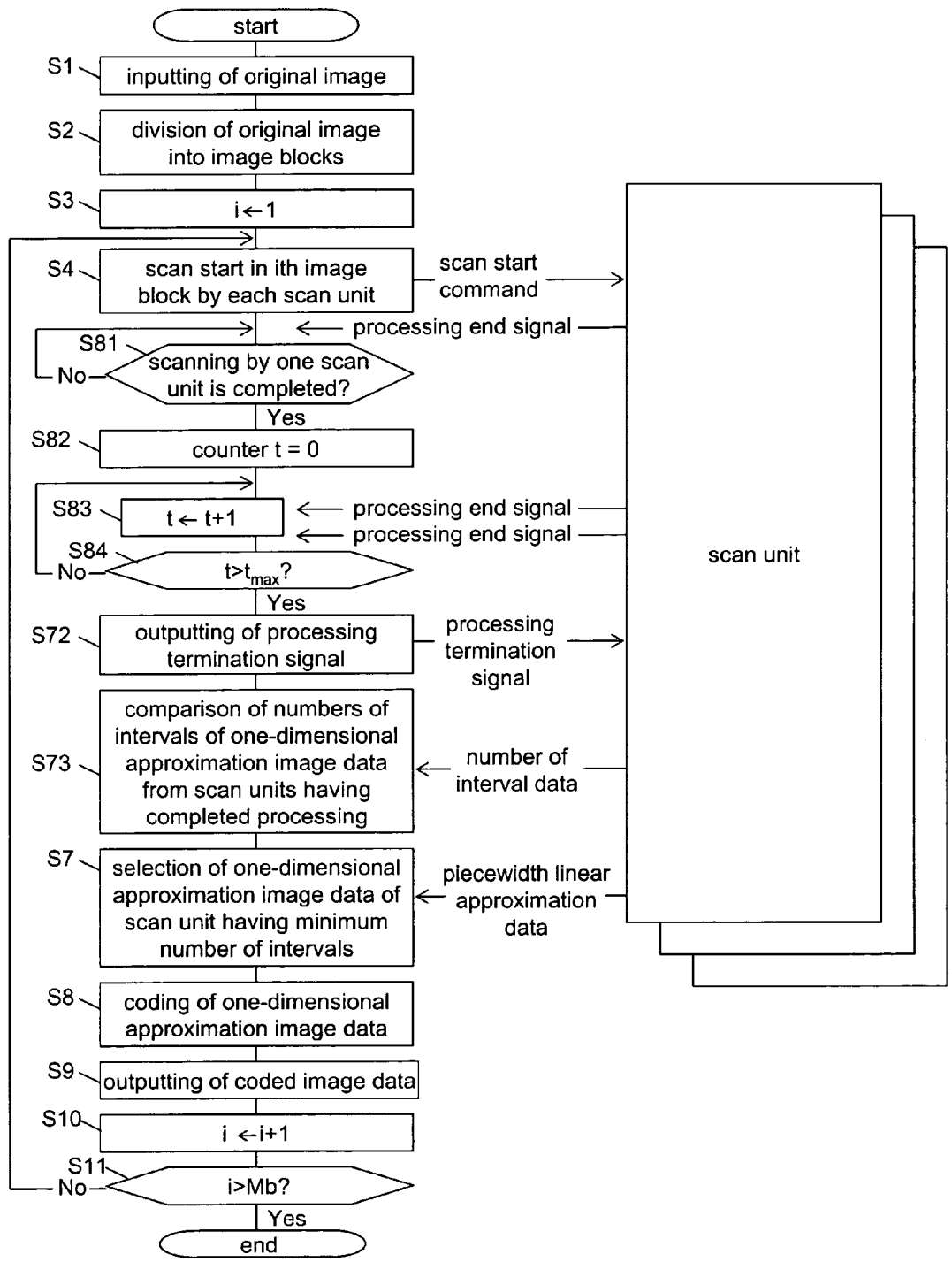
FIG. 21 is a flowchart showing another image coding method concerning the second embodiment.

FIG. 21 is a flowchart showing another image coding method concerning the second embodiment. The processing termination determining section 101, when one processing end signal is outputted from a scan unit (S81), resets a counter t included therein to 0 (S82) and starts counting (S83). The section outputs processing termination signals (S72) when the count value t exceeds a prescribed threshold value $t_{max}$ (S84). Operations coming later are similar to those described above.

The piecewidth linear approximation processing spends more time as more interval division is conducted in recursive processing. Hence, scan units having still not completed piecewidth linear approximation processing even if a prescribed time $t_{max}$ elapses after a first processing signal is outputted may be thought not to be less in the number of intervals than the number of intervals of one-dimensional approximation image data outputted by the scan units having completed piecewidth linear approximation processing in advance. Therefore, by forcibly terminating piecewidth linear approximation processing having not completed when the count value t exceeds a prescribed threshold value $t_{max}$, a high speed processing can be realized without reducing a coding efficiency.

Third Embodiment

In this embodiment, when one scan unit 3-$s$ completes piecewidth linear approximation processing and makes definite the number of intervals $l^{(s)}$ of the generated one-dimensional approximation image data, each of the other scan units forcibly terminates piecewidth linear approximation processing when the number of intervals $l_i$ thereof at a time point is equal to or more than the reference number of intervals $l_{st}$, wherein the definite number of intervals $l^{(s)}$ or a number $l^{(s)}+\Delta l$ obtained by adding a prescribed value to the definite number of intervals $l^{(s)}$ is adopted as the reference number of intervals $l_{st}$.

Figure 22:
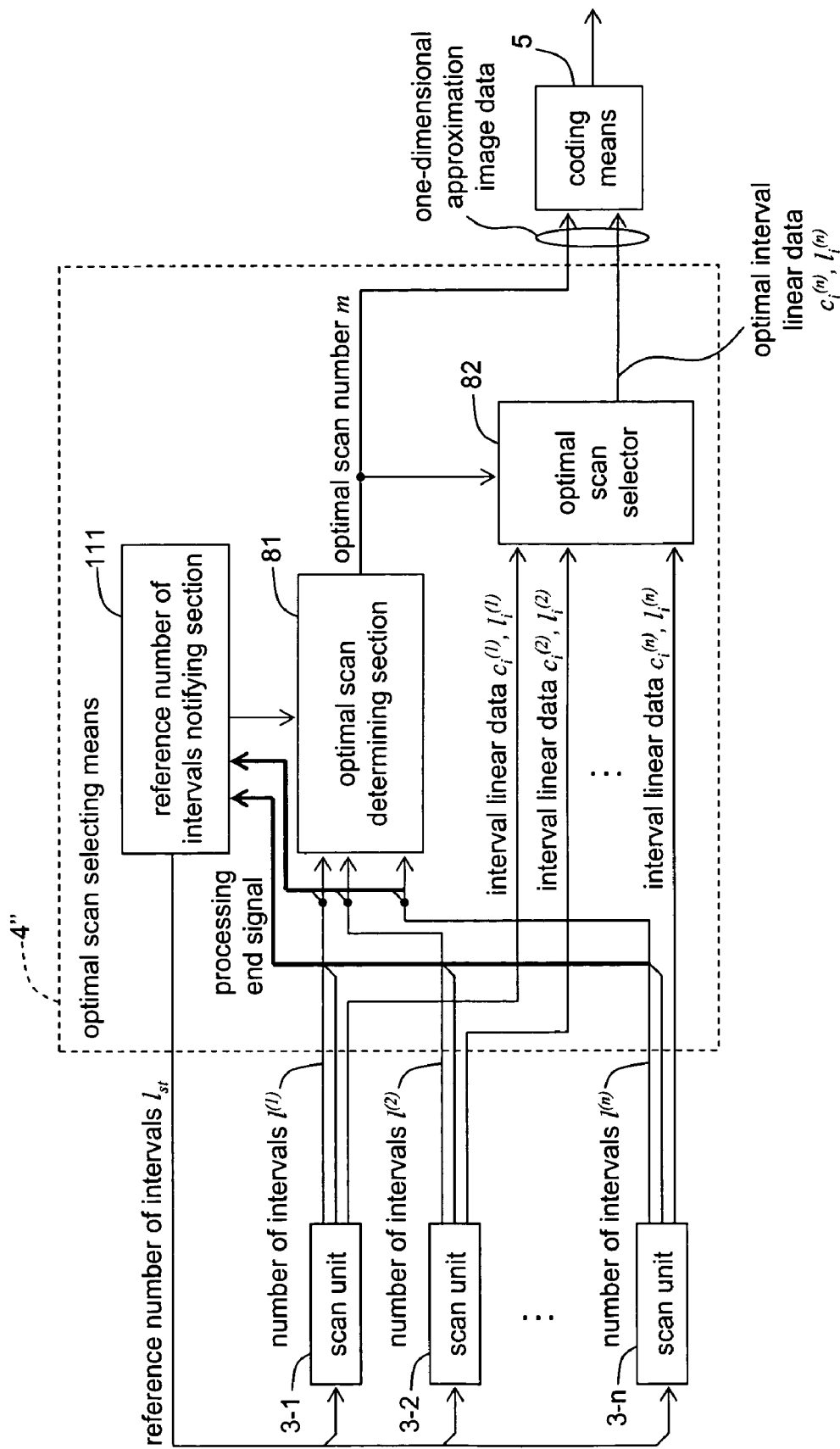
FIG. 22 is a block diagram showing an optimal scan selecting means 4" of an image coding apparatus concerning a third embodiment.
Figure 23:
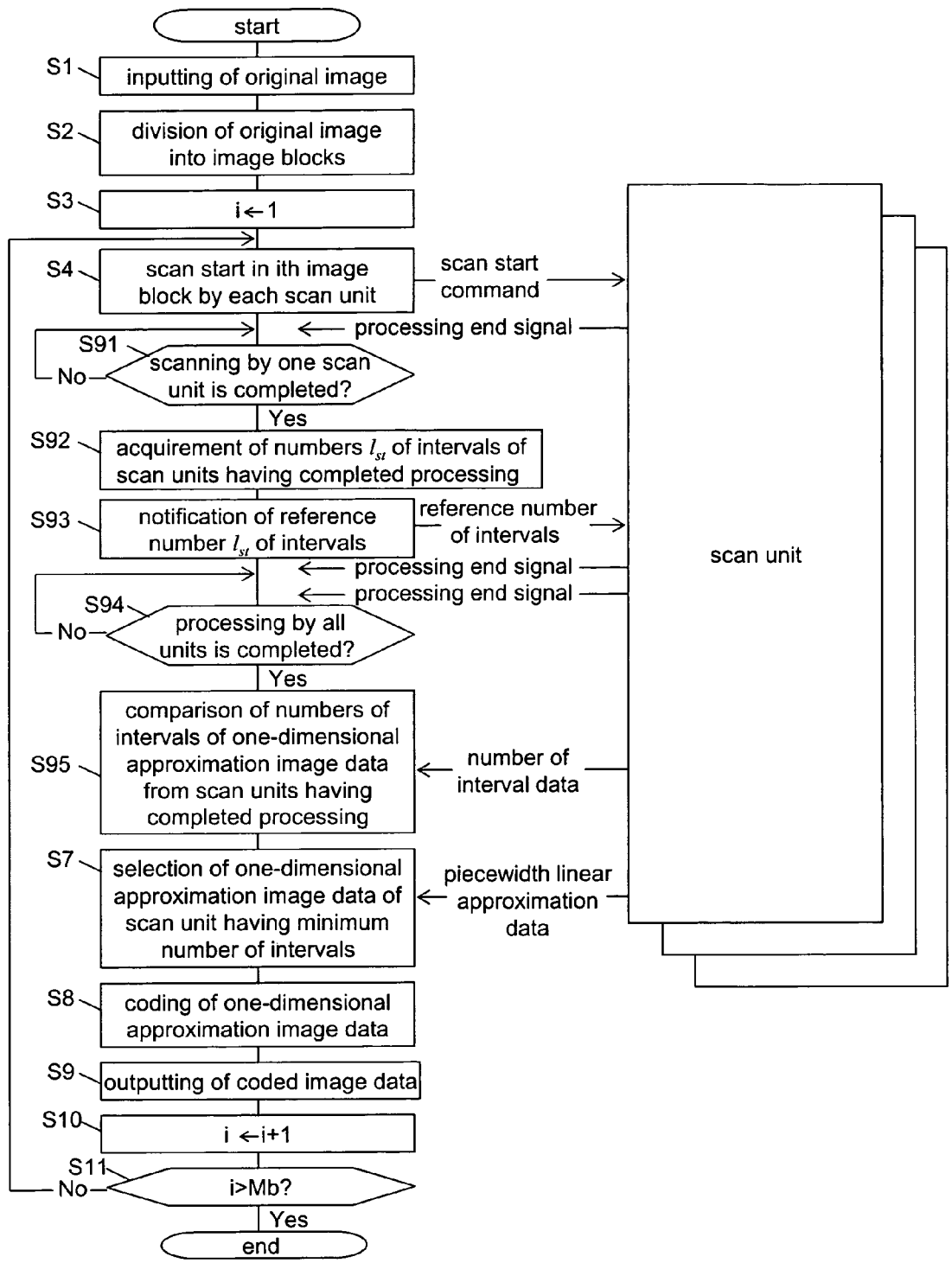
FIG. 23 is a flow chart showing an image coding method concerning a third embodiment.
Figure 24:
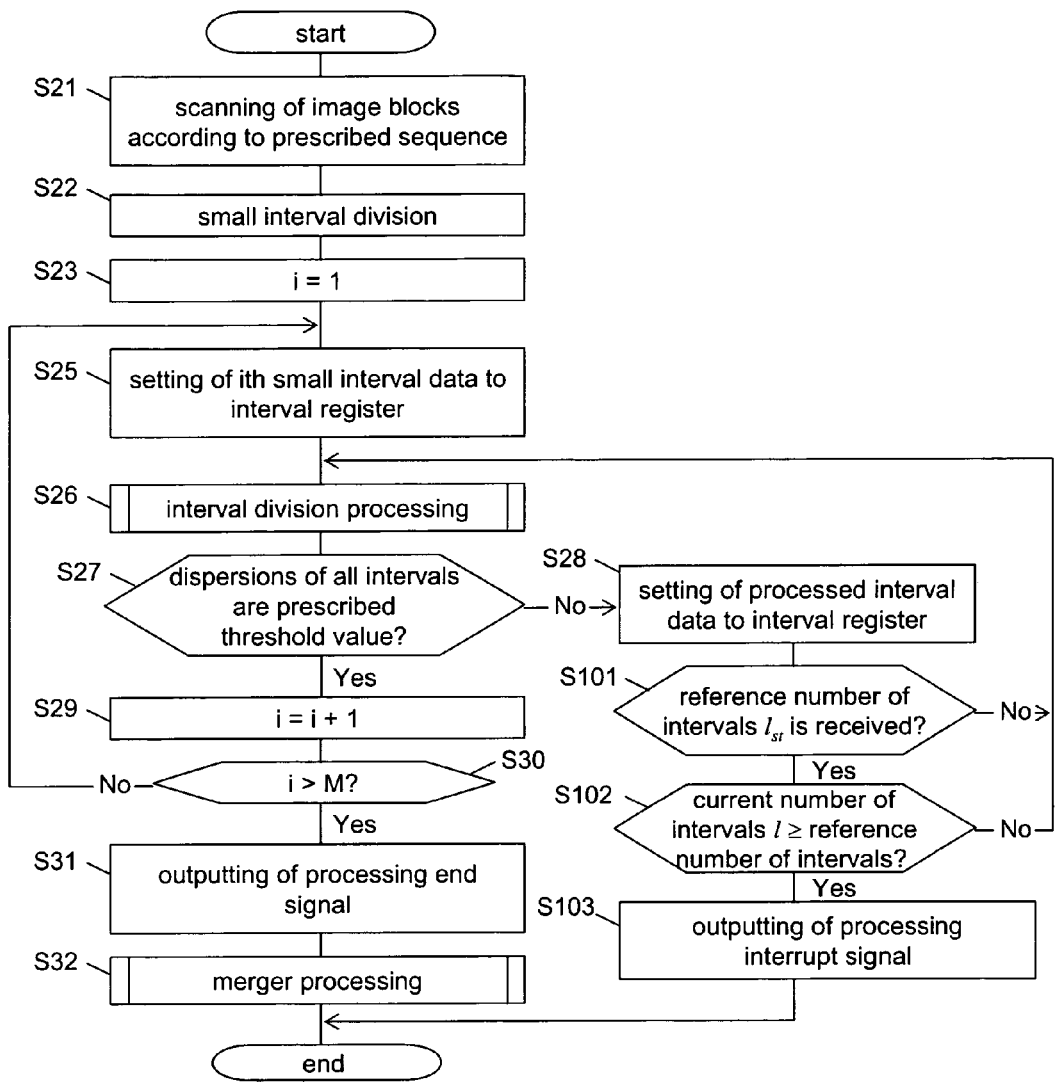
FIG. 24 is a flowchart showing operations in an operation unit of the image coding apparatus concerning a third embodiment.

FIG. 22 is a block diagram showing an optimal scan selecting means 4" of an image coding apparatus concerning the third embodiment. FIG. 23 is a flow chart showing an image coding method concerning a third embodiment. FIG. 24 is a flowchart showing operations in an operation unit of the image coding apparatus concerning a third embodiment.

The optimal scan selecting means 4" of this embodiment includes a reference number of intervals notifying section 111. Note that the other parts of the construction is similar to those described in the first embodiment; therefore description thereof is omitted.

The optimal scan selecting means 4", when one scan unit 3-$s$ outputs a processing end signal (S91), captures the number of intervals $l^{(s)}$ of the scan unit 3-$s$ having completed piecewidth linear approximation processing (S92). Then, the reference number of intervals $l^{(s)}$ or a number $l^{(s)}+\Delta l$ obtained by adding a prescribed number to the number of intervals $l^{(s)}$ is notified to the scan units 3-1 to 3-$n$ as the reference number of intervals $l_{st}$ (S93). Note that the reason why a number $l^{(s)}+\Delta l$ obtained by adding a prescribed number to the number of intervals $l^{(s)}$ can be a reference is that since a final number of intervals can be $l^{(i)}$ or less by the merger processing, a margin can be provided in consideration of the possibility.

Scan units 3-$i$ having not yet completed piecewidth linear approximation processing, when the reference number of intervals $l_{st}$ is inputted (S101), determines whether or not a current number of intervals l is the reference number of intervals $l_{st}$ or more before interval division processing (S26) is conducted in interval linear processing (S102). If $l<l_{st}$, interval division processing is recursively repeated in a similar way to that in the first embodiment (S26 to S28). On the other hand, if $l \geq l_{st}$ in step S102, a processing interrupt signal is outputted to the optimal scan selecting means 4" (S103) to thereby forcibly interrupt piecewidth linear approximation processing prior to completion.

The optimal scan selecting means 4" awaits till all the scan units 3-1 to 3-$n$ output a processing end signal or a processing interrupt signal (S94) and compares the numbers of intervals of one-dimensional approximation image data of the scan units which have outputted the processing end signal (S95). The optimal scan selecting means 4" selects one-dimensional approximation image having a minimum number of intervals (S7).

Note that the rest of the processing not included in the above is similar to those in the first embodiment.

By, in such a way, even if each of the scan units forcibly terminates piecewidth linear approximation processing without conducting to the completion when the reference number of intervals is reached or exceeded as well, a high speed processing can be achieved without reducing a coding efficiency.

Fourth Embodiment

Figure 25:
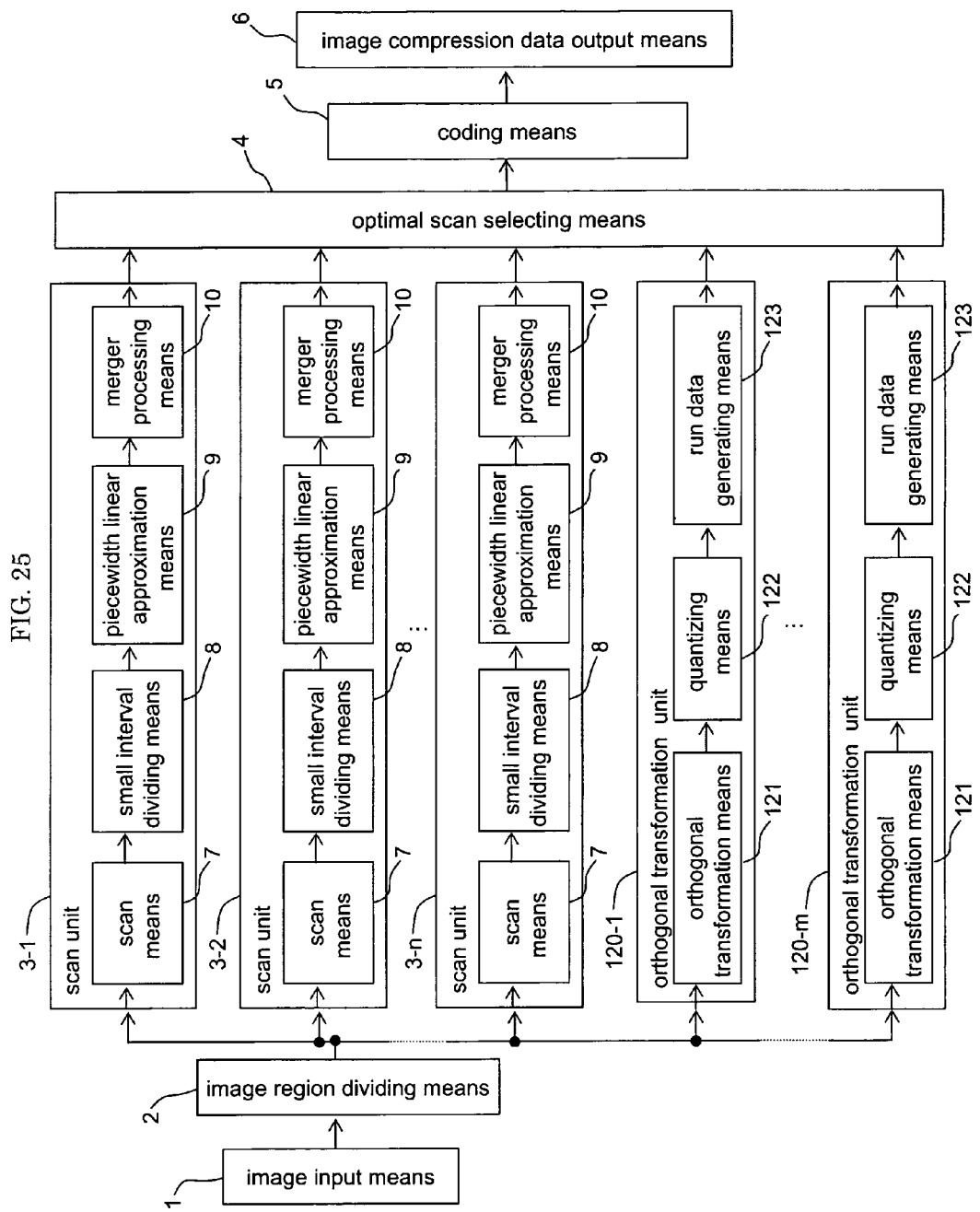
FIG. 25 is an overall construction diagram of an image coding apparatus concerning a fourth embodiment of the invention.

FIG. 25 is an overall construction diagram of an image coding apparatus concerning a fourth embodiment of the invention. In FIG. 25, the following constituents are similar to those in the first embodiment of FIG. 1: an image input means 1; an image region dividing means 2; scan units 3-1 to 3-$n$; an optimal scan selecting means 4; a coding means 5; an image compression data output means 6; a scan means 7, a small interval dividing means 8; a piecewidth linear approximation means 9; and a merger processing means 10.

This embodiment is characterized in that m orthogonal transformation units 120-1 to 120-$m$ are provided in parallel to the scan units 3-1 to 3-$n$. Each of the orthogonal transformation units 120-1 to 120-$m$ includes: an orthogonal transformation means 121; a quantizing means 122; and a run data generating means 123.

The orthogonal transformation means 121 applies orthogonal transformation to image blocks inputted from the image region dividing means 2 by means of a determined method to thereby generate a transformed image. Examples of orthogonal transformation that can be applied include: DCT, discrete sine transformation (DST), a discrete Fourier transformation; Hadamard transformation; Karhunen-Loéve transformation (KL transformation); Haar transformation; slant transformation and others.

The quantizing means 122 quantizes a transformed image outputted by the orthogonal transformation means 121 using adapted bit assignment. The quantized transformed image is referred to as a quantization transformed image. More of bits are assigned in quantization on the low band component in which spectra are highly concentrated, while less of bits are assigned in quantization to the high band component in which spectra are concentrated at a low level.

The run data generating means 123 scan a quantization transformed image. Scanning is conducted along a zigzag route from the low band side to the high band side. Since transformation coding has been widely employed in the operation, no further description is given thereof. The run data generating means 123 constitutes the above-described scanning and generates run data constituted of a pair of a run length in which pixels of the same value continue and the pixel value of the run. The run data is outputted to the optimal scan selecting means 4.

Description will be given of operations in the image coding apparatus concerning this embodiment with such a construction.

A procedure similar to that in the first embodiment is conducted till an image is first inputted to the image input means 1 and then the image region dividing means 2 outputs image blocks. The image blocks are inputted to the scan units 3-1 to 3-$n$ and the scan units 3-1 to 3-$n$ output one-dimensional approximation image data in a similar way as that in the first embodiment.

In this embodiment, the image region dividing means 2 outputs the image blocks to orthogonal transformation units 120-1 to 120-$m$ as well. In the orthogonal transformation units 120-1 to 120-$m$, as described above, the orthogonal transformation means 121 generates a transformed image and the quantizing means generates a quantization transformed image. The run data generating means 123 generates run data and outputs the data to the optimal scan selecting means 4. Note that if spectra is concentrated on the low band side in the transformed image, a run length on the high band side gets longer. Therefore, the number of runs gets fewer. Contrary to this, if spectra is concentrated at a low level, a run on the high band side gets shorter and the number of runs gets more.

The optimal scan selecting means 4 compares the number of intervals of one-dimensional approximation image data outputted by the respective scan units 3-1 to 3-$n$ and the number of runs of run data outputted by the respective orthogonal transformation units 120-1 to 120-$m$, and selects one-dimensional approximation image data or run data with a minimum number of intervals or a minimum number of runs. The coding means 5 encodes the selected one-dimensional approximation image data or the selected run data. The operations of the other parts are similar to those in the first embodiment.

In this embodiment, one-dimensional approximation image data generated by the scan units and run data generated by the orthogonal transformation units are compared with one another to thereby select a transformation method by which a coding volume is at the lowest level. Thereby, an optimal transformation method is selected according to the nature of an image, thereby enabling coding of an image to be conducted at a high coding efficiency.

What is claimed is:

1. An image coding apparatus comprising:
   (A) plural scan units which correspond to each of plural scan sequences different from one another, and each having
      (a) a scan means scanning an original image to be encoded according to a prescribed scan sequence, and
      (b) a piecewidth linear approximation (hereinafter referred to as "PLA") means dividing a one-dimensional (hereinafter referred to as "1D") original image generated by scanning said original image with said scan means into plural intervals so that one of an accumulated square error and a dispersion of pixel values in each interval is a prescribed threshold value or less to generate 1D approximation image data obtained by approximation of pixel values by an average value of pixel values in the interval; and
   (B) optimal scan selecting means comparing the numbers of intervals obtained by division by said PLA means for each said scan unit to thereby select said 1D approximation image data having a minimum number of intervals.

2. The image coding apparatus according to claim 1, wherein said PLA means executes a bisecting processing dividing said 1D original image at a divisional position at which the sum of said one of the accumulated square errors and the dispersions of pixel values in both intervals is minimized when said 1D original image is divided into two, and in a case where the sum of the accumulated square errors or the dispersions of pixel values in the both intervals obtained by division by said bisecting processing is a prescribed threshold value or more, said bisecting processing in the interval is implemented recursively to divide said 1D original image, when said 1D original image is divided.

3. The image coding apparatus according to claim 1, further comprising small interval division means dividing said 1D original image into plural small intervals, and
   said PLA means generates said 1D approximation image data for said 1D original image of each small interval obtained by division by said small interval division means.

4. The image coding apparatus according to claim 3, wherein merger processing means replacing the approximate value of the both intervals with the average of the values of all the pixels of the both intervals in connection with 1D approximation image data of said each small interval generated by said PLA means, if a difference between the averages of pixel values in the intervals between the opposing ends in adjacent two small intervals is a prescribed threshold value or less and a length of one interval is a prescribed threshold value or less.

5. The image coding apparatus according to claim 1, wherein said optimal scan selecting means makes the PLA means, having not completed generation processing of said 1D approximation image data in prescribed time, terminate the generation processing, and compares the numbers of intervals obtained by division by said PLA means of each said scan unit having completed the processing to thereby select said 1D approximation image data having a minimum number of intervals, when said PLA means of a prescribed number of said scan units complete generation processing of said 1D approximation image data.

6. The image coding apparatus according to claim 1, wherein said optimal scan selecting means starts counting of clocks, when generation processing of said 1D approximation image data of one of said PLA means of said scan units ends, and makes said PLA means, having not completed generation processing of said 1D approximation image data in a prescribed time, terminate the generation processing, and compares the numbers of intervals obtained by division by said PLA means of each said scan unit having completed the processing in the prescribed time, to thereby select said 1D approximation image data having a minimum number of intervals.

7. The image coding apparatus according to claim 1, wherein
   said optimal scan selecting means, when generation processing of said 1D approximation image data of one of said PLA means of said scan units is completed, transmits the number of intervals of the 1D approximation image data as a reference number of intervals to other said scan units,
   said PLA means of said each scan unit, when said scan unit receives said reference number of intervals, terminates generation processing of said 1D approximation image data if the number of intervals obtained by division of a 1D original image exceeds the number obtained by adding a prescribed value to the reference number of intervals, and
   said optimal scan selecting means compares the numbers of intervals obtained by division by said PLA means of each said scan unit having completed generation processing of the 1D approximation image data, to select 1D approximation image data having a minimum number of intervals.

8. The image coding apparatus according to claim 1, further comprising at least one orthogonal transformation unit including:
   (a) an orthogonal transformation means conducting orthogonal transformation on an original image to be encoded to generate a transformed image;
   (b) a quantizing means quantizing the transformed image by adaptive bit assignment to thereby generate a quantization transformed image; and
   (c) a run data generating means not only scanning the quantization transformed image in a prescribed route, but also generating run data constituted of a pair of a run length in which pixels with the same value continues along a scan route and the pixel value for the run is provided,
   wherein said optimal scan selecting means compares the numbers of intervals obtained by division by said PLA means of each said scan unit and the numbers of runs generated by said run data generating means of said orthogonal transformation unit (hereinafter referred to as the "number of runs") to thereby select a 1D approximation image data having a minimum number of intervals or a minimum number of runs.

9. The image coding apparatus according to claim 2, wherein at least one orthogonal transformation unit including:
   (a) an orthogonal transformation means conducting orthogonal transformation on an original image to be encoded to generate a transformed image;
   (b) a quantizing means quantizing the transformed image by adaptive bit assignment to thereby generate a quantization transformed image; and
   (c) a run data generating means not only scanning the quantization transformed image in a prescribed route, but also generating run data constituted of a pair of a run length in which pixels with the same value continues along a scan route and the pixel value for the run is provided,
   wherein said optimal scan selecting means compares the numbers of intervals obtained by division by said PLA means of said scan units and the numbers of runs generated by said run data generating means of said orthogonal transformation unit (hereinafter referred to as the "number of run") to thereby select a 1D approximation image data having one of a minimum number of intervals and a minimum number of runs.

10. The image coding apparatus according to claim 3, wherein at least one orthogonal transformation unit including:
   (a) an orthogonal transformation means conducting orthogonal transformation on an original image to be encoded to generate a transformed image;
   (b) a quantizing means quantizing the transformed image by adaptive bit assignment to thereby generate a quantization transformed image; and
   (c) a run data generating means not only scanning the quantization transformed image in a prescribed route, but also generating run data constituted of a pair of a run length in which pixels with the same value continues along a scan route and the pixel value for the run is provided,
   wherein said optimal scan selecting means compares the numbers of intervals obtained by division by said PLA means of said scan units and the numbers of runs generated by said run data generating means of said orthogonal transformation unit (hereinafter referred to as the "number of run") to thereby select a 1D approximation image data having one of a minimum number of intervals and a minimum number of run.

11. The image coding apparatus according to claim 4, wherein at least one orthogonal transformation unit including:
   (a) an orthogonal transformation means conducting orthogonal transformation on an original image to be encoded to generate a transformed image;
   (b) a quantizing means quantizing the transformed image by adaptive bit assignment to thereby generate a quantization transformed image; and
   (c) a run data generating means not only scanning the quantization transformed image in a prescribed route, but also generating run data constituted of a pair of a run length in which pixels with the same value continues along a scan route and the pixel value for the run is provided,
   wherein said optimal scan selecting means compares the numbers of intervals obtained by division by said PLA means of said scan units and the numbers of runs generated by said run data generating means of said orthogonal transformation unit (hereinafter referred to as the "number of run") to thereby select a 1D approximation image data having one of a minimum number of intervals and a minimum number of runs.

12. The image coding apparatus according to claim 5, wherein at least one orthogonal transformation unit including:
   (a) an orthogonal transformation means conducting orthogonal transformation on an original image to be encoded to generate a transformed image;
   (b) a quantizing means quantizing the transformed image by adaptive bit assignment to thereby generate a quantization transformed image; and
   (c) a run data generating means not only scanning the quantization transformed image in a prescribed route, but also generating run data constituted of a pair of a run length in which pixels with the same value continues along a scan route and the pixel value for the run is provided,
   wherein said optimal scan selecting means compares the numbers of intervals obtained by division by said PLA means of said scan units and the numbers of runs generated by said run data generating means of said orthogonal transformation unit (hereinafter referred to as the "number of run") to thereby select a 1D approximation image data having one of a minimum number of intervals and a minimum number of runs.

13. The image coding apparatus according to claim 6, wherein at least one orthogonal transformation unit including:
   (a) an orthogonal transformation means conducting orthogonal transformation on an original image to be encoded to generate a transformed image;
   (b) a quantizing means quantizing the transformed image by adaptive bit assignment to thereby generate a quantization transformed image; and
   (c) a run data generating means not only scanning the quantization transformed image in a prescribed route, but also generating run data constituted of a pair of a run length in which pixels with the same value continues along a scan route and the pixel value for the run is provided,
   wherein said optimal scan selecting means compares the numbers of intervals obtained by division by said PLA means of said scan units and the numbers of runs generated by said run data generating means of said orthogonal transformation unit (hereinafter referred to as the "number of run") to thereby select a 1D approximation image data having one of a minimum number of intervals and a minimum number of runs.

14. The image coding apparatus according to claim 7, wherein at least one orthogonal transformation unit including:
   (a) an orthogonal transformation means conducting orthogonal transformation on an original image to be encoded to generate a transformed image;
   (b) a quantizing means quantizing the transformed image by adaptive bit assignment to thereby generate a quantization transformed image; and
   (c) a run data generating means not only scanning the quantization transformed image in a prescribed route, but also generating run data constituted of a pair of a run length in which pixels with the same value continues along a scan route and the pixel value for the run is provided,
   wherein said optimal scan selecting means compares the numbers of intervals obtained by division by said PLA means of said scan units and the numbers of runs generated by said run data generating means of said orthogonal transformation unit (hereinafter referred to as the "number of run") to thereby select a 1D approximation image data having one of a minimum number of intervals and a minimum number of runs.

15. An image coding method performed by an image coding apparatus comprising:
   a first step of dividing a 1D original image generated by scanning an original image to be coded according to a prescribed scan sequence into plural intervals so that one of an accumulated square error and a dispersion of pixel values in each interval is a prescribed threshold value or less and conducting PLA processing generating 1D approximation image data obtained by approximation of pixel values by an average of pixel values in each of the intervals in parallel so as to be adapted to respective plural scan sequences different from one another;
   a second step of comparing the numbers of intervals of 1D approximation image data obtained by PLA processing in each respective scan sequence to thereby select 1D approximation image data having a minimum number of intervals; and
   a third step of coding the selected 1D approximation image data.

16. The image coding method according to claim 15, wherein the PLA processing conducts a bisecting processing dividing the 1D original image at a divisional position at which the sum of one of the accumulated square errors and dispersions of pixel values in both intervals into which the 1D original image is divided is minimized, wherein in a case where the sum of the accumulated square errors or the dispersions of pixel values in the both intervals into which the 1D original image is divided by bisecting processing is a prescribed threshold value or more, the bisecting processing in the both intervals is implemented recursively to divide the 1D original image.

17. The image coding method according to claim 15, wherein
   in the first step, orthogonal transformation is conducted on an original image to be coded to thereby generate a transformed image, a quantization transformed image is generated by quantizing the transformed image by adapted bit assignment, and not only is the quantization transformed image scanned in a prescribed route, but scanning generating run data constituted of a pair of a run length in which pixels with the same value continues along a scan route and the pixel value of the run is also conducted in parallel;
   in the second step, the numbers of intervals of 1D approximation image data obtained by PLA processing in the respective scan sequence and the numbers of runs of the run data (hereinafter referred to as the "number of runs") are compared to thereby select 1D approximation image data having a minimum number of intervals or a minimum number of runs; and
   in the third step, the selected 1D approximation image data or the selected run data is encoded.

* * * * *